(12) United States Patent
Nguyen et al.

(10) Patent No.: US 8,108,793 B2
(45) Date of Patent: Jan. 31, 2012

(54) ZONE-ASSOCIATED OBJECTS

(75) Inventors: Laurent An Minh Nguyen, Los Altos, CA (US); John T. Kim, La Canada, CA (US); Jay M. Pucket, Cupertino, CA (US); Mitchell A. Yawitz, Belmont, CA (US)

(73) Assignee: Amazon Technologies, Inc., Reno, NV (US)

( * ) Notice: Subject to any disclaimer, the term of this patent is extended or adjusted under 35 U.S.C. 154(b) by 657 days.

(21) Appl. No.: 11/763,328

(22) Filed: Jun. 14, 2007

(65) Prior Publication Data

US 2008/0295021 A1 Nov. 27, 2008

Related U.S. Application Data

(60) Provisional application No. 60/939,357, filed on May 21, 2007, provisional application No. 60/939,359, filed on May 21, 2007.

(51) Int. Cl.
*G06F 3/048* (2006.01)
(52) U.S. Cl. ........................................ 715/792; 715/856
(58) Field of Classification Search .................. 715/792, 715/790
See application file for complete search history.

(56) References Cited

U.S. PATENT DOCUMENTS

| | | | |
|---|---|---|---|
| 5,566,098 A | 10/1996 | Lucente et al. | |
| 5,663,748 A | 9/1997 | Huffman et al. | |
| 5,742,905 A | 4/1998 | Pepe et al. | |
| 5,847,698 A | 12/1998 | Reavey et al. | |
| 6,037,954 A | 3/2000 | McMahon | |
| 6,075,537 A * | 6/2000 | Adapathya et al. | 715/760 |
| 6,222,541 B1 * | 4/2001 | Bates et al. | 715/786 |
| 6,233,318 B1 | 5/2001 | Picard et al. | |
| 6,385,596 B1 | 5/2002 | Wiser et al. | |
| 6,820,111 B1 * | 11/2004 | Rubin et al. | 709/203 |
| 6,938,076 B2 | 8/2005 | Meyer et al. | |
| 6,938,207 B1 * | 8/2005 | Haynes | 715/711 |
| 6,999,565 B1 | 2/2006 | Delaney et al. | |
| 7,009,596 B2 | 3/2006 | Seet et al. | |
| 7,249,060 B2 | 7/2007 | Ling | |
| 7,298,851 B1 | 11/2007 | Hendricks et al. | |

(Continued)

FOREIGN PATENT DOCUMENTS

CN 1313910 A 9/2001

(Continued)

OTHER PUBLICATIONS

The European Search Report mailed Feb. 21, 2011 for European Patent Application No. 08769558.1, a counterpart foreign application for U.S. Appl. No. 11/763,328, 6 pages.

(Continued)

*Primary Examiner* — Omar Abdul-Ali
(74) *Attorney, Agent, or Firm* — Lee & Hayes, PLLC

(57) ABSTRACT

Zone-associated objects enable easier consumption of electronic media items that are presented to a user on a screen of a computing device. Zone-associated objects enable displaying electronic content on the screen of the computing device, the screen having multiple zones. Each object presented on the screen may be associated with one or more of the zones. The user may then select one of the multiple zones and, in response, may be allowed to select objects associated with that zone. In some instances, the user may then select one or more of these zone-associated objects to perform the action defined by the object.

27 Claims, 23 Drawing Sheets

U.S. PATENT DOCUMENTS

| | | | |
|---|---|---|---|
| 7,304,635 B2 | 12/2007 | Seet et al. | |
| 7,376,913 B1 * | 5/2008 | Fleck et al. | 715/864 |
| 7,386,480 B2 | 6/2008 | Sarig | |
| 7,401,286 B1 | 7/2008 | Hendricks et al. | |
| 7,533,152 B2 | 5/2009 | Stark et al. | |
| 7,562,032 B2 | 7/2009 | Abbosh et al. | |
| 2001/0017634 A1 * | 8/2001 | Scott | 345/767 |
| 2001/0027478 A1 | 10/2001 | Meier et al. | |
| 2002/0065955 A1 * | 5/2002 | Gvily | 709/330 |
| 2002/0103809 A1 | 8/2002 | Starzl et al. | |
| 2002/0120635 A1 | 8/2002 | Joao | |
| 2002/0184319 A1 | 12/2002 | Willner et al. | |
| 2003/0018720 A1 | 1/2003 | Chang et al. | |
| 2003/0212613 A1 | 11/2003 | Sarig | |
| 2004/0090463 A1 * | 5/2004 | Celik et al. | 345/767 |
| 2004/0268253 A1 | 12/2004 | DeMello et al. | |
| 2005/0012679 A1 * | 1/2005 | Karlov | 345/1.1 |
| 2005/0044148 A1 | 2/2005 | Son et al. | |
| 2005/0183009 A1 * | 8/2005 | Hannebauer et al. | 715/517 |
| 2005/0229119 A1 | 10/2005 | Torvinen | |
| 2005/0246619 A1 * | 11/2005 | Krause | 715/500 |
| 2006/0190568 A1 | 8/2006 | Patterson | |
| 2006/0281058 A1 | 12/2006 | Mangoaela | |
| 2006/0294454 A1 * | 12/2006 | Matsuda | 715/501.1 |
| 2007/0118803 A1 * | 5/2007 | Walker et al. | 715/744 |
| 2007/0240187 A1 | 10/2007 | Beach et al. | |
| 2008/0082518 A1 | 4/2008 | Loftesness | |

FOREIGN PATENT DOCUMENTS

| | | |
|---|---|---|
| EP | 1736858 A2 | 12/2006 |
| GB | 2351639 A | 1/2001 |

OTHER PUBLICATIONS

Translated Chinese Office Action mailed May 25, 2011 for Chinese patent application No. 200880025125.2, a counterpart foreign application of U.S. Appl. No. 11/763,328, 7 pages.

* cited by examiner

200

Moby Dick, by Herman Melville                    Close ■

602 — CHAPTER 72                              204

The Monkey-Rope

In the tumultuous business of cutting-in and attending to a whale, there is much running backwards and forwards among the crew. Now hands are wanted here, and then again hands are wanted there. There is no staying in any one place; for at one and the same time everything has to be done everywhere. It is much the same with him who endeavors the description of the scene. We must now retrace our way a little. It was mentioned that upon first breaking ground in the whale's back, the blubber-hook was inserted into the original hole there cut by the spades of the mates. But how did so clumsy and weighty a mass as that same hook get fixed in that hole? It was inserted there by my particular friend Queequeg, whose duty it was, as harpooneer, to descend upon the monster's back for the special purpose referred to. But in very many cases, circumstances require that the harpooneer shall remain on the whale till the whole tensing or stripping operation is concluded. The whale, be it observed, lies almost entirely submerged, excepting the immediate parts operated upon. So down there, some ten feet below the level of the deck, the poor harpooneer flounders about, half on the whale and half in the water, as the vast mass revolves like a tread-mill beneath him. On the occasion in question, Queequeg figured in the Highland costume- a shirt and socks- in which to my eyes, at least, he appeared to uncommon advantage; and no one had a better chance to observe him, as will presently be seen.

Being the savage's bowsman, that is, the person who pulled the bow-oar in his boat (the second one from forward), it was my cheerful duty to attend upon him while taking that hard-scrabble scramble upon the dead whale's back.

Fig. 6

ZONE-ASSOCIATED OBJECTS

RELATED APPLICATION(S)

This application claims the benefit of U.S. Provisional Application No. 60/939,357 filed on May 21, 2007, as well as U.S. Provisional Application No. 60/939,359 filed May 21, 2007, both of which are incorporated by reference herein in their entirety.

BACKGROUND

Users have traditionally consumed media items (such as books, magazines, newspapers, etc.) in hard-copy form. For instance, a user may obtain a physical book from a bookstore or a library. The user may read the book by manually flipping through its pages in conventional fashion.

A user may now also receive and consume some media items in electronic form. In one case, a user may use a personal computer to connect to a network-accessible source of media items via a conventional telephone or cable modem. The user may then download a document from this source. The user may consume the document by printing it out and reading it in conventional fashion. Alternatively, the user may read the document in electronic form, that is, by reading the book as presented on a computer monitor.

A provider of electronic media items faces various challenges. For instance, many users continue to prefer consuming media items in traditional form, even though these media items are available in electronic form. The provider confronts the task of capturing the interest of such users, while providing a viable solution from a technical standpoint and a business-related standpoint.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 6 illustrates a screen, such as illustrated in FIGS. 2 and 3, after selection of a zone. As illustrated, the screen highlights one of the objects associated with the selected zone. The cursor actuator may be used to jog amongst the zone-associated objects.

DETAILED DESCRIPTION

This disclosure is directed to zone-associated objects, which enable easier consumption of electronic items that are presented to a user on a screen of a computing device. Zone-associated objects enable displaying electronic content on the screen of the computing device, the screen having multiple zones. Each object presented on the screen may be associated with one or more of the zones. The user may then select one of the multiple zones and, in response, may be allowed to select objects associated with that zone. In some instances, the user may then select one or more of these zone-associated objects to perform the action defined by the object.

Zone-associated objects may be selected by a user with a two step process. To select an object, the screen may include one or more zones. Each object may then be assigned or associated with one or more of these zones. In some instances, these objects are assigned based on location of the objects. That is, each object may be associated with the corresponding zone in which the object resides. In some instances, these zones may overlap, which enables association of a single object to multiple zones.

To select a displayed object, a user may first select one of the zones. After selection of a zone, the user may then be allowed to select a desired one of multiple objects associated with the selected zone.

For purposes of discussion, zone-associated objects are described in the context of an electronic-book reader. One illustrative implementation of this environment is provided below. However, it should be appreciated that the described techniques may be implemented in other environments.

Illustrative Device

Figure 1:
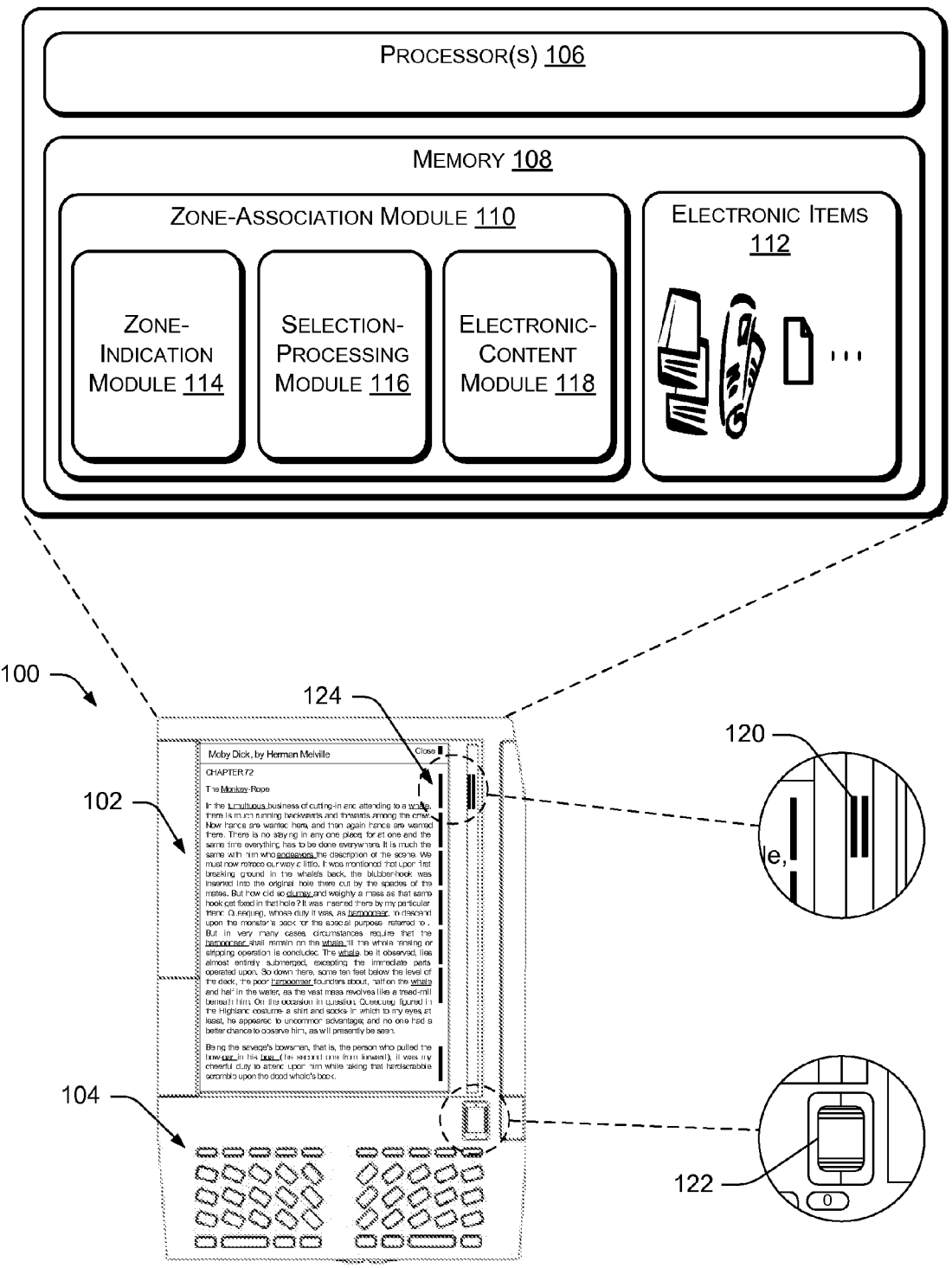
FIG. 1 illustrates one example of an electronic-booker reader which may implement zone-associated objects, as described herein.

FIG. 1 illustrates one example of an electronic-book reader 100 employing techniques described herein. Electronic-book reader 100 is merely provided as an example; multiple other computing devices may similarly employ the described techniques. The devices may include, without limitation, a personal computer, a laptop computer, a Portable Digital Assistant (PDA), a mobile phone, a set-top box, a game console, and so forth.

As illustrated, electronic-book reader 100 includes a display 102 as well as a keypad 104. Electronic-book reader 100 also includes one or more processors 106 and memory 108. Memory 108 may include volatile and nonvolatile memory, removable and non-removable media implemented in any method or technology for storage of information, such as computer-readable instructions, data structures, program modules, or other data. Such memory includes, but is not limited to, computer-readable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which may be used to store the desired information and which may be accessed by a computing device. Computer readable program code, meanwhile, may be any type of code stored on any type of computer-readable medium.

Memory 108 includes a zone-association module 110 as well as one or more electronic items 112. Zone-association module 110 includes a zone-indication module 114, a selection-processing module 116, and an electronic-content module 118. Electronic items 112 may comprise any sort of electronic content capable of being rendered on display 102. These items may include, for example, an electronic book, Web pages, electronic news articles, applications, device tools, and the like. FIG. 1 illustrates display 102 currently displaying an electronic book, namely MOBY DICK by Herman Melville.

Although the displayed electronic item may vary, many of the displayed electronic items may include one or more objects. These objects may include plain text, hyperlinks, external links, internal links, text boxes (e.g., search boxes), check boxes, images, or any other type of data capable of being displayed upon display 102. In the case of external links, a displayed link may comprise a hyperlink such as a Uniform Resource Locator (URL) address. This hyperlink could comprise a link to a store at which a user of electronic-book reader 100, referred to herein as reader 100, could peruse and buy additional electronic items 112. This hyperlink could also comprise a web link to some other web-associated content, such as a Web page or the like.

These displayed objects may also include internal links, such as links to another digital item stored on reader 100 which display 102 is not currently displaying. In addition, an internal link could point to a location within a currently-displayed digital item. For instance, a link entitled "Chapter 1" may be displayed. When this link is selected, reader 100 may accordingly display Chapter One of the displayed electronic book.

To select these displayed objects, the displayed content may include one or more selectable markers 124. Selectable markers 124 each correspond to a portion of the displayed content. To select a selectable marker (and, hence, a corresponding portion of the displayed content), reader 100 includes one or more selection tools, such as a cursor 120 and a cursor actuator 122. Keypad 104 may also function as a selection tool as discussed below. Cursor actuator 122 may comprise a thumbwheel or the like and may function to align cursor 120 with a desired selectable marker. In the illustrated implementation, cursor actuator 122 may move cursor 120 in a single dimension (e.g., vertically). Once aligned, a user may actuate cursor actuator 122 to select the selectable marker and the corresponding displayed content.

While FIG. 1 illustrates cursor 120 and actuator 122, other selection means may be used in other environments. These may include, for example, a rollerball, a mouse, a touchpad, or the like. In addition, although FIG. 1 illustrates selectable markers 124, other implementations may not include these markers. Still other implementations may include these markers when displaying some but not other types of content on display 102. For instance if a web browser and corresponding web content are displayed, then display 102 may not include markers 124. If, however, a home page, or the like, of reader 100 is displayed, then markers 124 may be included.

With reference back to zone-association module 110, zone-indication module 114 may contain a mapping of multiple zones of display 102 of reader 100. Selection-processing module 116, meanwhile, receives a selection of a portion of the displayed electronic content from cursor 120 and cursor actuator 122. Responsive to receipt of this selection, selection-processing module 116 may determine a position of cursor 120. Selection-processing module 116 may then query zone-indication module 114 to determine a zone corresponding to the determined position of the cursor. Electronic-content module 118 may receive this determination of the selected zone and, in response, may enable selection of displayed content within the selected zone. For instance, electronic-content module 118 may allow text to be highlighted within this zone or may allow selection of objects such as links within this zone.

In some instances, the multiple zones indicated by zone-indication module may be static. That is, the number and location of zones for display 102 may remain constant without regard to the displayed electronic content. In other instances, however, the size and/or number of the multiple zones may be dynamic and/or configurable. For instance, these zones may vary depending on the currently-displayed electronic content. These zones may also change if and when a format of the displayed electronic content changes. For instance, imagine zone-indication module 114 indicates each line of displayed electronic content corresponds to a particular zone. If a user of reader 100 changes a font of the displayed electronic content, each zone may change in size. The total number of zones may also change.

With use of these multiple zones, objects displayed upon display 102 may be associated with one of more of the zones. In some instances, each object is associated with a zone in which the object resides. Zone-association module 110 may thus enable a user to select a zone and, in response, may allow the user to modify or select an object associated with the selected zone. Selecting the object may result in performance of an action defined or indicated by the object. For instance, zone-association module 110 may allow a user to highlight text with use of cursor 120 or may allow the user to select a link with use of the cursor. In some instances, selection of a zone may result in presentation of a listing of the objects associated with the selected zone.

Detailed actions of zone-association module 110 are described below in a section entitled "Illustrative Zone-Associated Objects". While this following section describes illustrative techniques of implementing zone-associated objects, it is specifically noted that other techniques are similarly envisioned.

Illustrative Zone-Associated Objects

Figure 2:
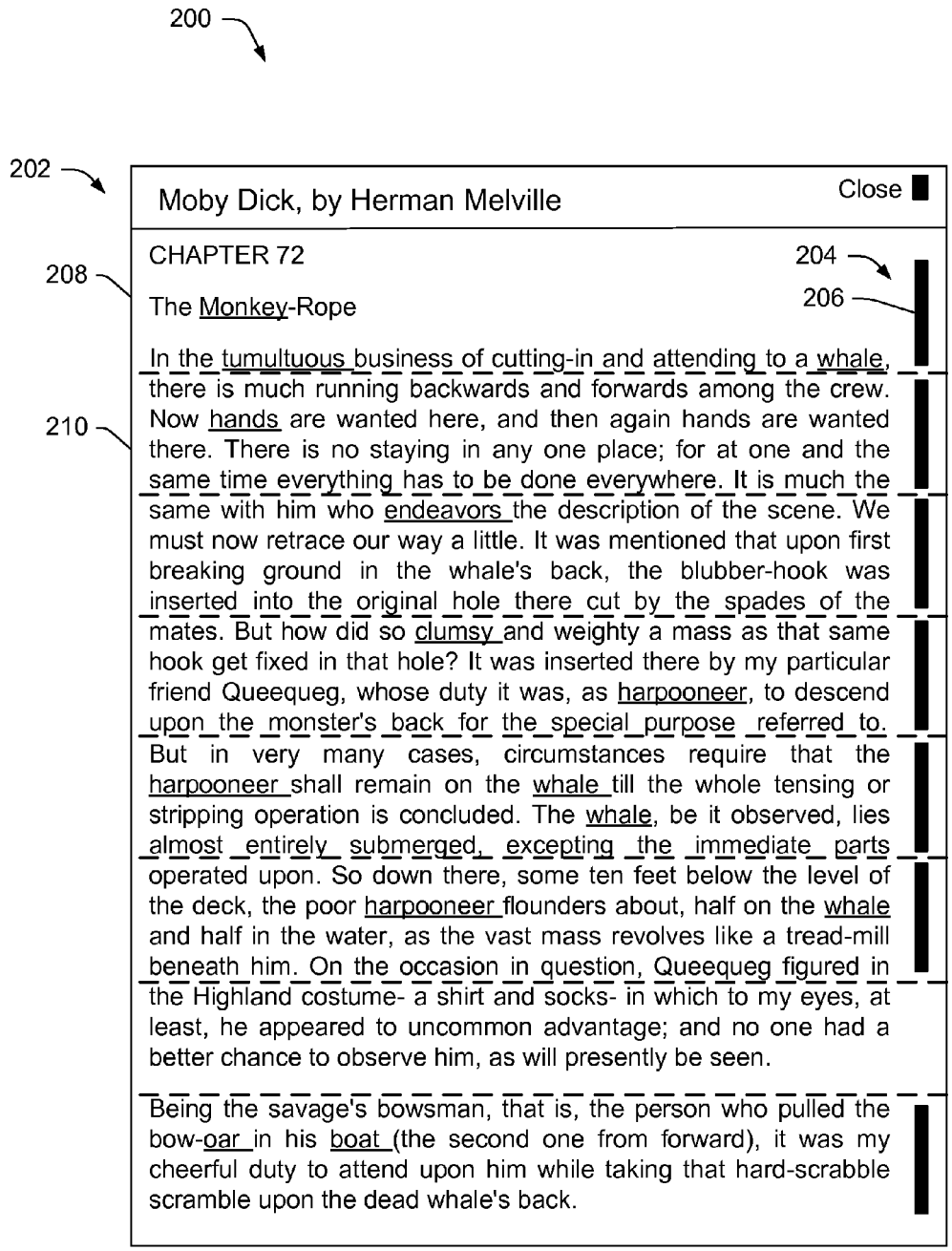
FIG. 2 illustrates a screen including multiple zones to enable association between the zones and any objects residing therein.

FIG. 2 illustrates an illustrative screen 200 of electronic-book reader 100. Again, screen 200 is shown to display an electronic book, which includes multiple objects within the book's text. In the instant example, these objects are illustrated and discussed as links. Note, however, that some of the objects may merely comprise plain text or the like, which could be highlighted or otherwise modified. The links, meanwhile, are illustrated as underlined words within the text, although in other implementations the links may not appear in underline. As discussed above, these links may comprise web links, links to a location within a currently-displayed digital item (i.e., within MOBY DICK), links to another locally-stored digital item (e.g., another electronic book), and/or links to a store to purchase digital items.

In order to select one of these multiple links, screen 200 includes a plurality of zones 202. These zones may be defined in a number of ways. For instance, a zone may be defined as a predetermined portion of screen 200, as FIG. 2 illustrates. In these instances, some or all of the zones may be approximately equal area. In other instances, however, each zone may contain a predetermined byte offset value, a predetermined number of words, or the like. In some of these instances, the zones may not be of approximately equal area.

Screen 200 may include one or more selectable markers 204, each corresponding to a particular zone. For instance, FIG. 2 illustrates a selectable marker 206 that corresponds to a zone 208. Again, other implementations may not include selectable markers 204 or may only include these markers when illustrating certain content.

Each link within screen 200 may be assigned or associated with one or more of zones 202. In some instances, these links may be assigned or associated with the zone or zones in which the links reside. For instance, links corresponding to the terms "Monkey", "Tumultuous", and "Whale" may correspond to zone 208.

Figure 3:
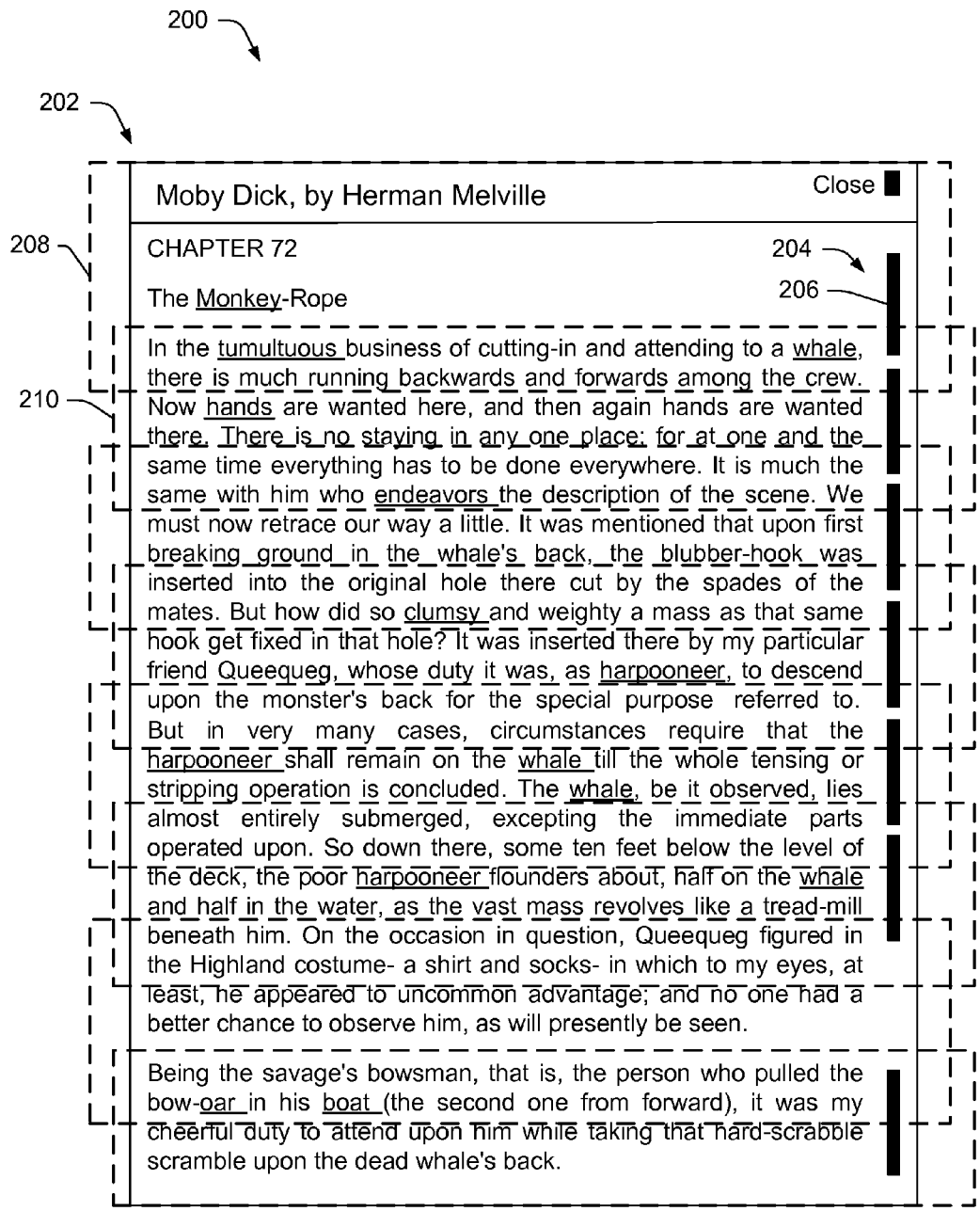
FIG. 3 illustrates the screen of FIG. 2. In the instant example, the zones comprise overlapping horizontal slices of the screen.

FIG. 3 illustrates, in some instances, one or more of zones 202 may overlap with one another. As such, certain links may associate with multiple zones. The illustrating links corresponding to the terms "Tumultuous" and "Whale", for instance, may correspond to a zone 210 in addition to zone 208.

With use of cursor 120 and cursor actuator 122, a user may select one of zones 202 by selecting a corresponding one of selectable markers 204. For instance, the user may select zone 208 by aligning cursor 120 with selectable marker 206 and actuating cursor actuator 122. Selection of zone 208 may enable the user to select one or more links associated with this zone. In some instances, a list or menu of the links associated with zone 208 may be presented to the user.

Figure 4:
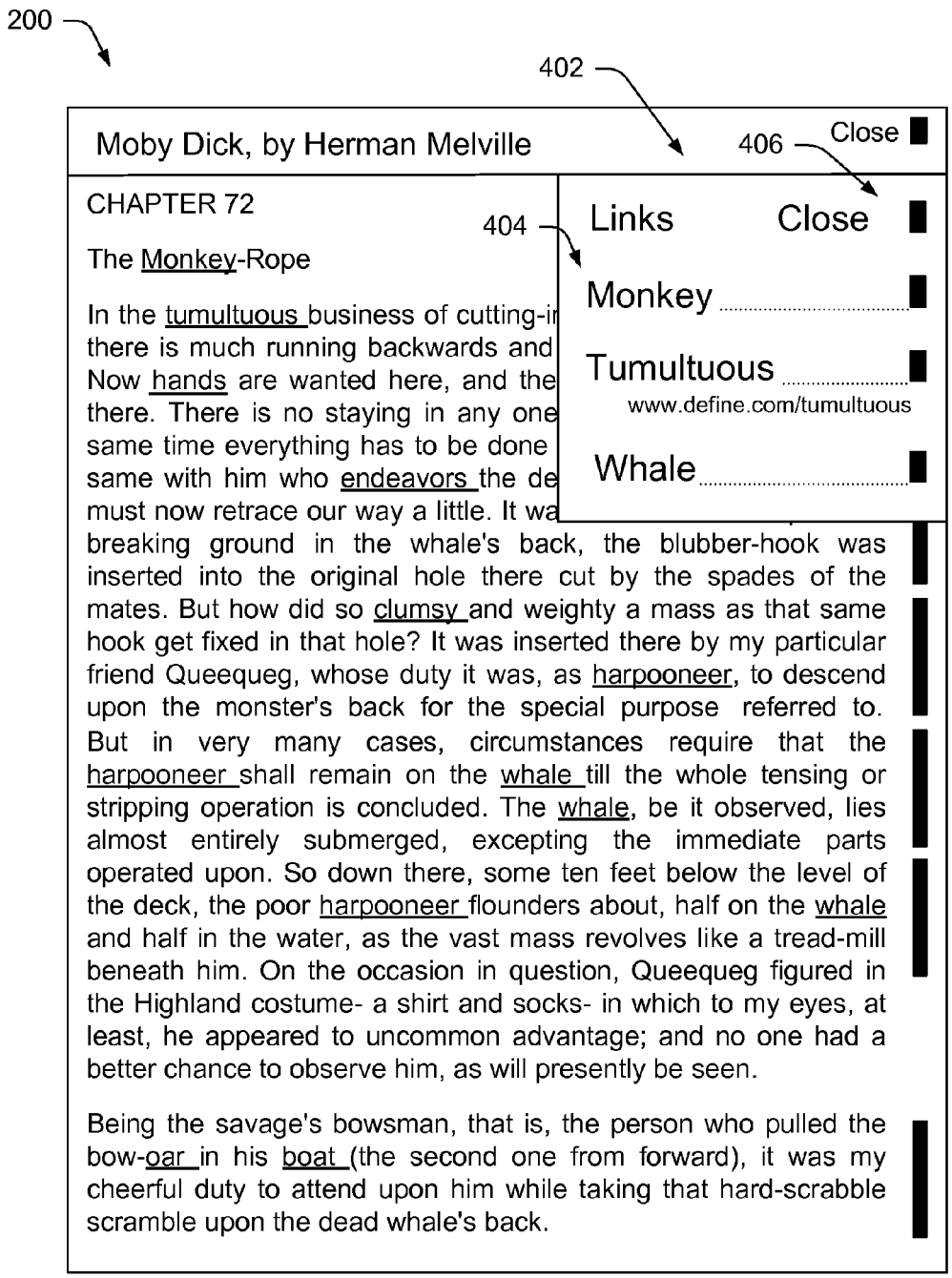
FIG. 4 illustrates a screen, such as illustrated in FIGS. 2 and 3, after selection of a zone. As illustrated, the screen presents a menu of objects (e.g., links) associated with the selected zone.

FIG. 4 illustrates one illustrative instance of screen 200 after selection of marker 206 and, hence, selection of zone 208. Screen 200 is shown to include a menu 402 containing links 404 entitled "Monkey", "Tumultuous", and "Whale". Menu 402 also illustrates information associated with the links, such as URL addresses for any listed web links. Screen 200 also shows multiple selectable markers 406, each corresponding to one of the presented links. The markers 406 each appear as a small black rectangle as illustrated in FIG. 4, however, these may be presented as other shapes and may be presented in color. For example, the markers 406 may be implemented as dots, or dashes, or may be implemented as circles. The shading of the marker may be filled or have other pattern. The markers 406 identify selections available to the user. The user may select one of these links by selecting a corresponding one of markers 406. Of course, selection of a link may result in performance of the action defined by the selected link. For instance, if the "tumultuous" link represents a web link, then actuation of this link may cause screen 200 (or some portion thereof) to display content associated with the web link.

By dividing screen 200 into zones 202, a user is able to utilize a one-dimensional selection means (e.g., cursor 120 and cursor actuator 122) to effectively and efficiently select links within content displayed in screen 200. That is, zone-associated objects enable a cursor to select these links despite the fact that, in some instances, a user may only displace cursor 120 in a vertical direction. The user may do so by first selecting a zone to view a menu of links associated with that zone and then selecting one of the links within the menu. This zone-association may also allow the user to modify displayed objects. For instance, a user could highlight a sentence spanning multiple lines by selecting a zone, selecting a word at which to begin highlighting, and a word at which to end highlighting.

Figure 5:
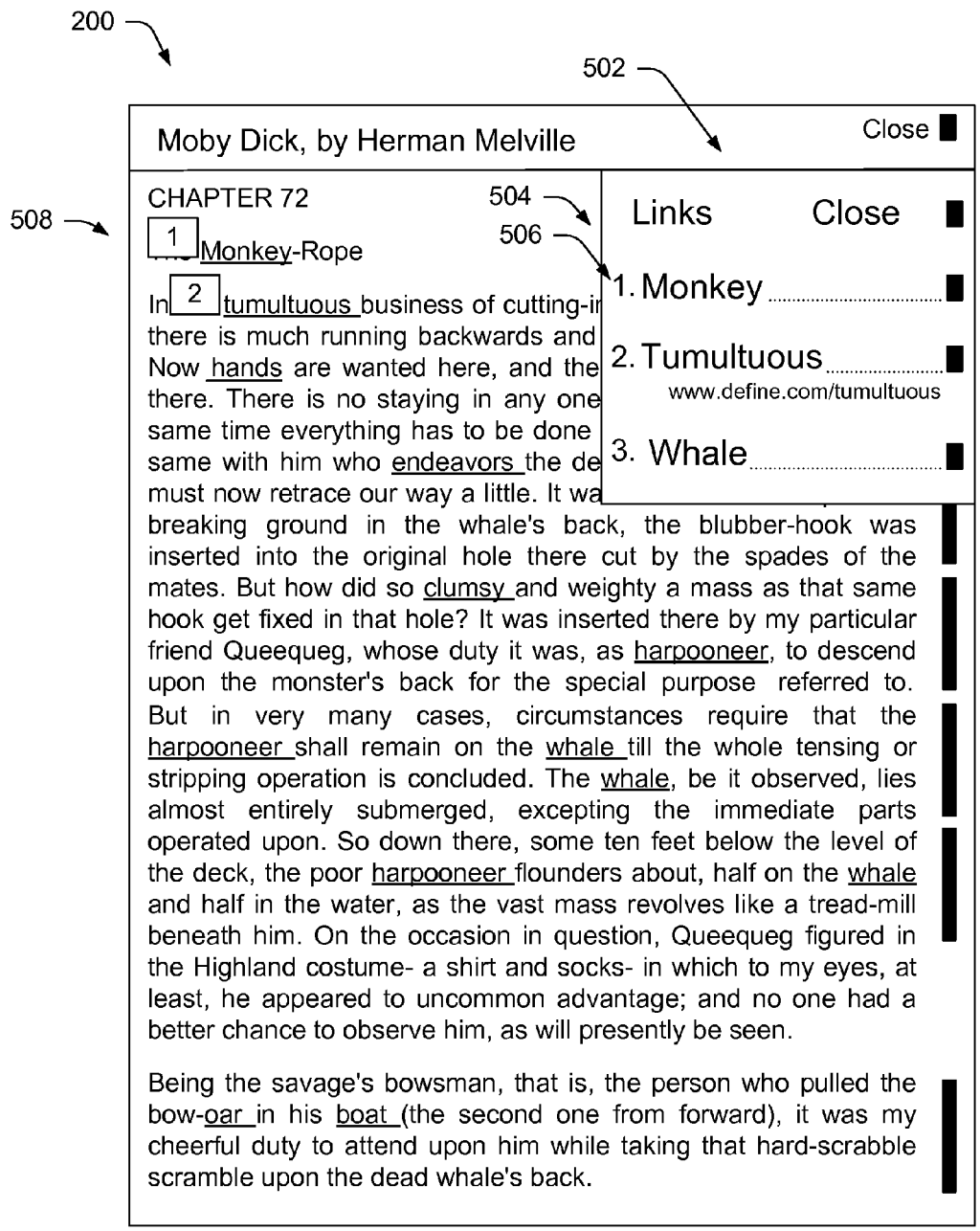
FIG. 5 illustrates a screen, such as illustrated in FIGS. 2 and 3, after selection of a zone. As illustrated, the screen presents another menu of objects associated with the selected zone. The screen also presents a symbol next to each of the objects associated with the selected zone. These symbols enable and/or assist in selection of the zone-associated objects.

FIG. 5 illustrates another instance of screen 200 after selection of zone 208. Again, reader 100 provides a menu 502 of links 504 associated with zone 208. In this instance, however, menu 502 includes unique symbols 506 for each of the zone-associated links. Here, these symbols are illustrated as numerals, although letters or other symbols may be used in other implementations. In some instances, a user may utilize keypad 104 to select one of links 504. For instance, if the user wishes to select the link corresponding to "tumultuous", the user may actuate the "2" button on keypad 104. Actuation of this button may result in screen 200 displaying content associated with the defined web link. Again, the user may also select a corresponding selectable marker to select a desired link. The markers are similar to markers 406 in FIG. 4.

FIG. 5 also illustrates a set of unique symbols 508 may be displayed adjacent to each of the associated links within the displayed content. While FIG. 5 depicts numerals, other implementations may instead utilize letters or other symbols. Again, a user may actuate a "2" button on keypad 104 to select the illustrated "tumultuous" link.

By providing menu 502 including unique symbols 506, as well as providing corresponding unique symbols 508 within the content's text, a user may be able to visually associate the menu listing with the links within the text. Note, however, while FIG. 5 shows menu 504 as well as symbols 508, other implementations may instead utilize one or the other in isolation. Note, in the present example illustrated in FIG. 5, the unique symbols 506 and 508 are consistent for a given link selection. Alternate embodiments may implement other schemes, wherein the marker may also be consistent, all three may be different, or any combination thereof.

FIG. 6 depicts yet another instance of screen 200 after selection of zone 208. Here, screen 200 portrays a highlight 602 around one or more of the zone-associated links. In some instances, a first of these links (e.g., "Monkey") may initially be highlighted with highlight 602. A user may then use cursor actuator 122 to move highlight 602 amongst the different zone-associated links. To select a link, the user may move this highlight to the desired link before actuating cursor actuator 122.

After a user has scrolled highlight 602 amongst each of the links, highlight 602 may return to the first link (e.g., "Monkey"). Conversely, after a user scrolls through each of the links, highlight 602 may disappear and screen 200 may return to zone selection. That is, the focus of cursor 120 may again return to one of selectable markers 204. In addition, note highlight 602 could also highlight a zone while the user chooses amongst zones 202.

Figure 7:
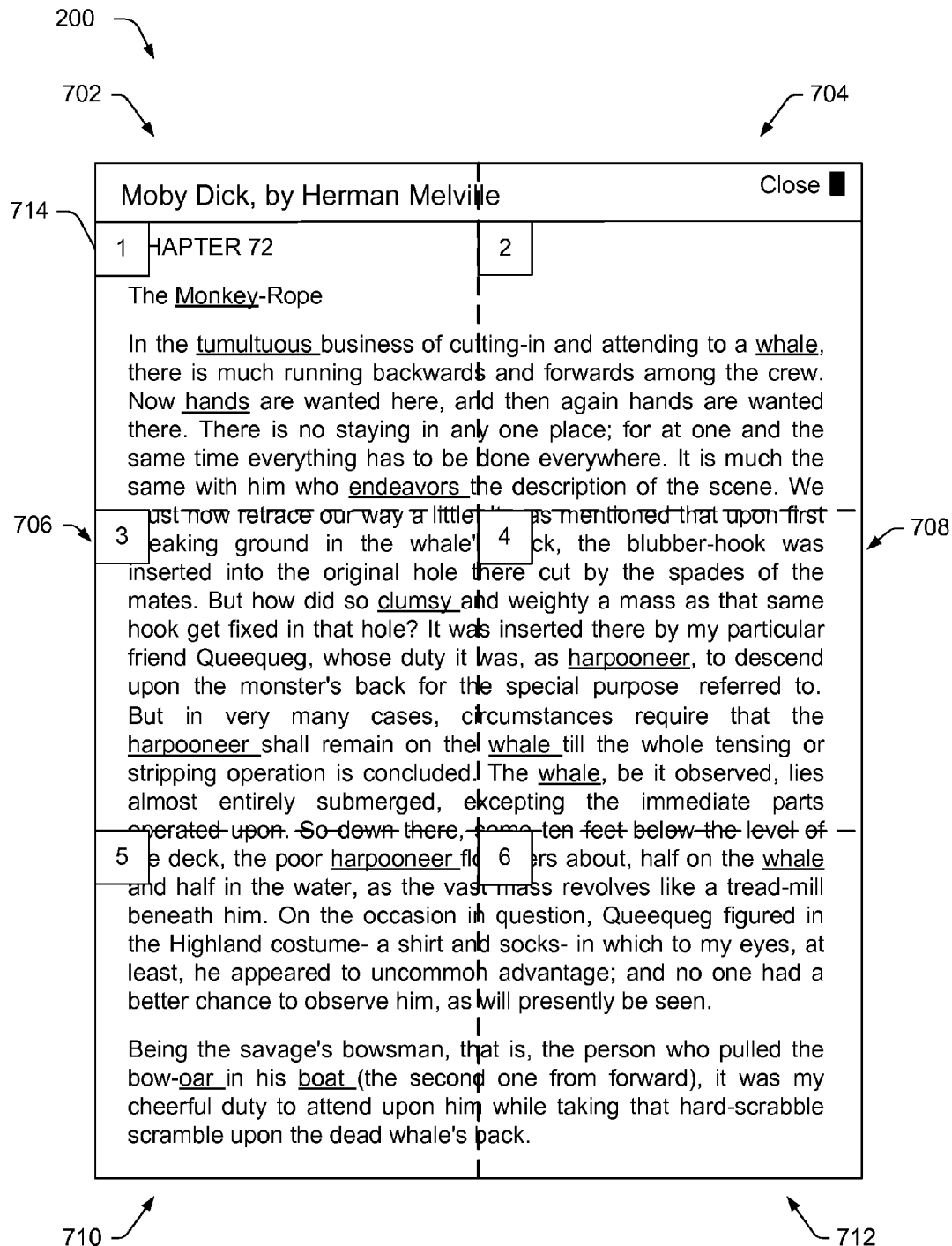
FIG. 7 illustrates another screen having multiple zones to enable association between the zones and objects residing therein. In the instant example, the screen is illustrated as divided into a grid and the zones comprise portions of the grid.

FIG. 7 illustrates another manner in which illustrative screen 200 may be divided into one or more zones. In this instance, screen 200 has been divided into a grid, each portion of which comprises one of zones 702, 704, . . . , 712. Again, links (as well as other displayed objects) within screen 200 may be associated with the zone or zones in which each link resides. In instances where a portion of a link resides a first zone and another portion of the link resides in a second zone, the link may associate with both zones. Conversely, the link may associate with the zone in which a larger portion of the link resides, or with the zone in which the beginning of the link resides.

Here, screen 200 also includes unique symbols (e.g., numerals) corresponding to each of zones 702-712 to enable selection of these zones. For instance a unique symbol 714 in the form of a "1" is shown to correspond to zone 702. A user may therefore select zone 702 by actuating a button on keypad 104, the button corresponding to numeral one.

In addition to actuating numeral buttons on a keypad, each of zones 702-712 may be selected by jogging amongst each zone with use of cursor actuator 122. For instance, when actuator 122 comprises a thumbwheel, user could scroll amongst the zones before choosing a desired zone, such as zone 702. Similar to the discussion of FIG. 6, a highlight may border a corresponding one of zones 702-712 as the user jogs amongst the zones.

Figure 8:
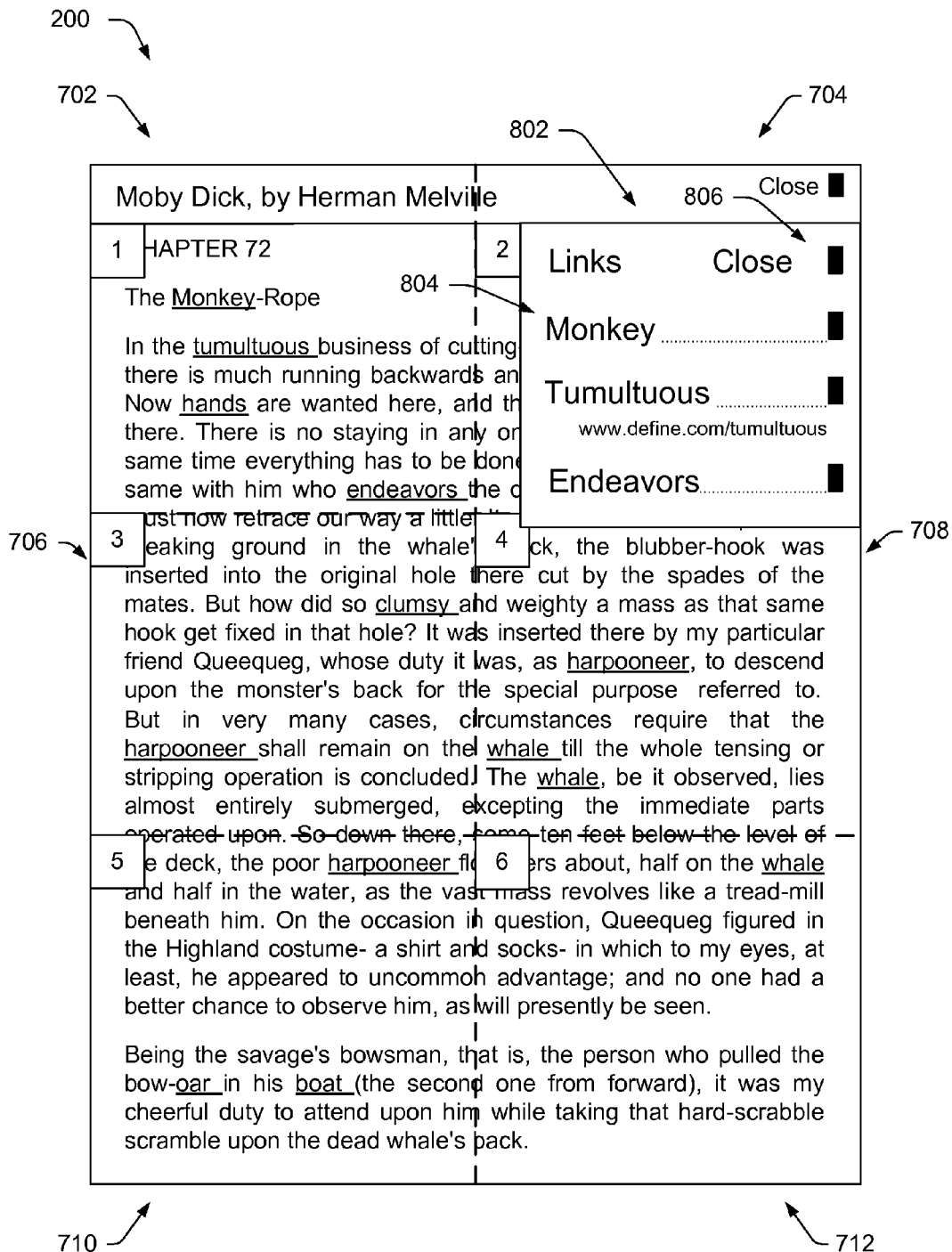
FIG. 8 illustrates a screen, such as illustrated in FIG. 7, after selection of a zone. As illustrated, the screen presents a menu of objects associated with the selected zone.

When a user selects a zone such as zone 702, screen 200 may enable the user to select each of the links associated with (e.g., located within) zone 702. FIG. 8 illustrates that, in some instances, screen 200 may present a menu 802 of links 804 to the user. Here, links 804 are entitled "Monkey", "Tumultuous", and "Endeavors". Screen 200 also depicts multiple selectable markers 806, each corresponding to one of the presented links. The user may select one of these links by selecting a corresponding one of markers 806. In addition, each of selection markers 806 could correspond to a numeral or letter, similar to symbol 714. In these instances, the user would utilize keypad 104 to select each link.

Illustrative Screens and Objects

Figure 9:
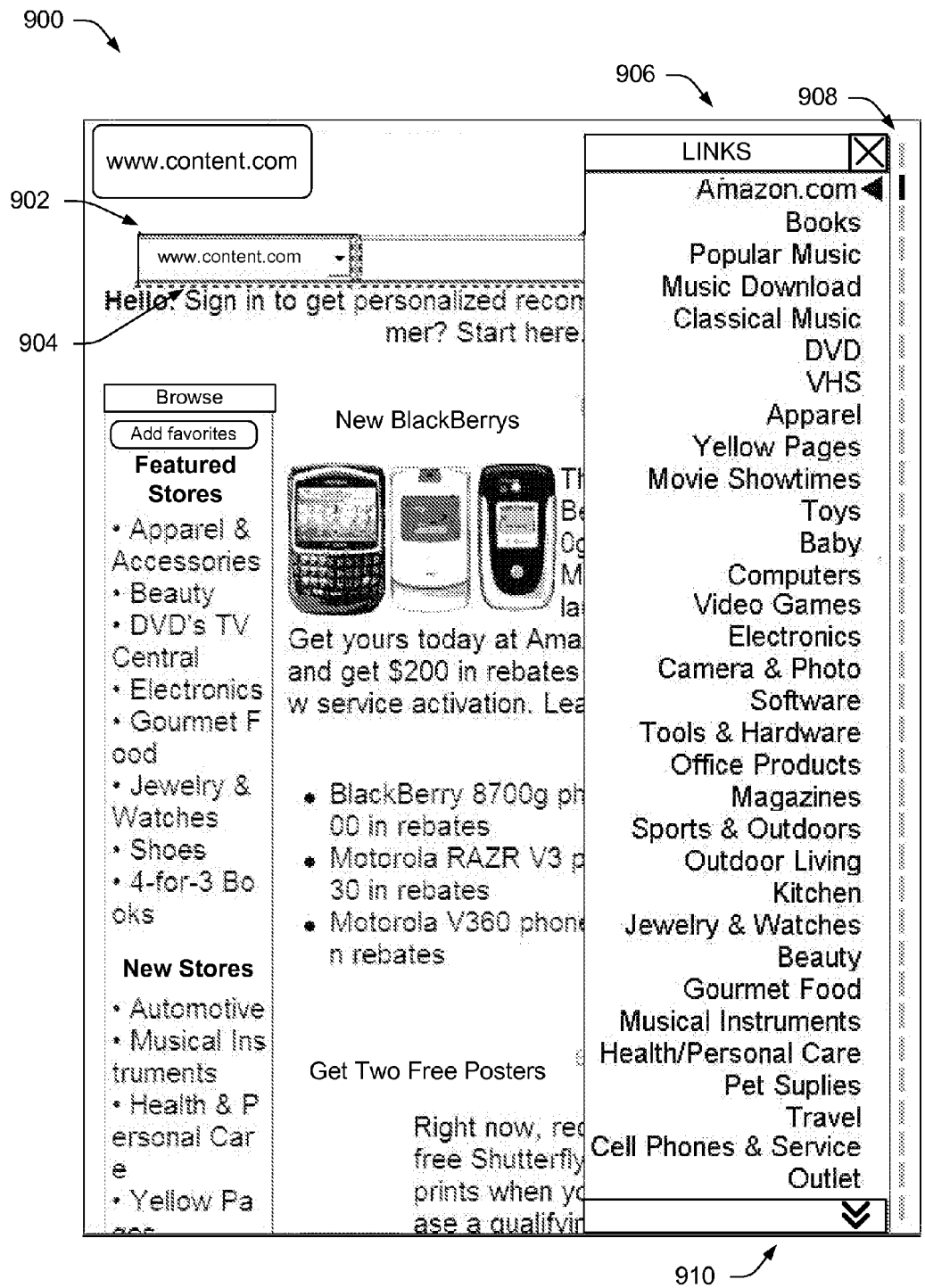
FIGS. 9-19 illustrate other examples of screens utilizing zones for selection of associated objects. These figures illustrate a multitude of different objects which may utilize the described techniques.

This section describes other illustrative screens which may be rendered by display 102 and which may utilize zones and zone-associated objects. FIG. 9, for instance, illustrates a screen 900 after selection of a zone 902. Zone 902 is shown to include a drop-down-menu object 904. As illustrated, selection of this object results in the rendering of drop-down menu 906. Screen 900 also includes selectable markers 908 for selecting links in menu 906. Finally, menu 906 includes a drop-down actuator 910 to enable a user to view additional links within menu 906.

Figure 10:
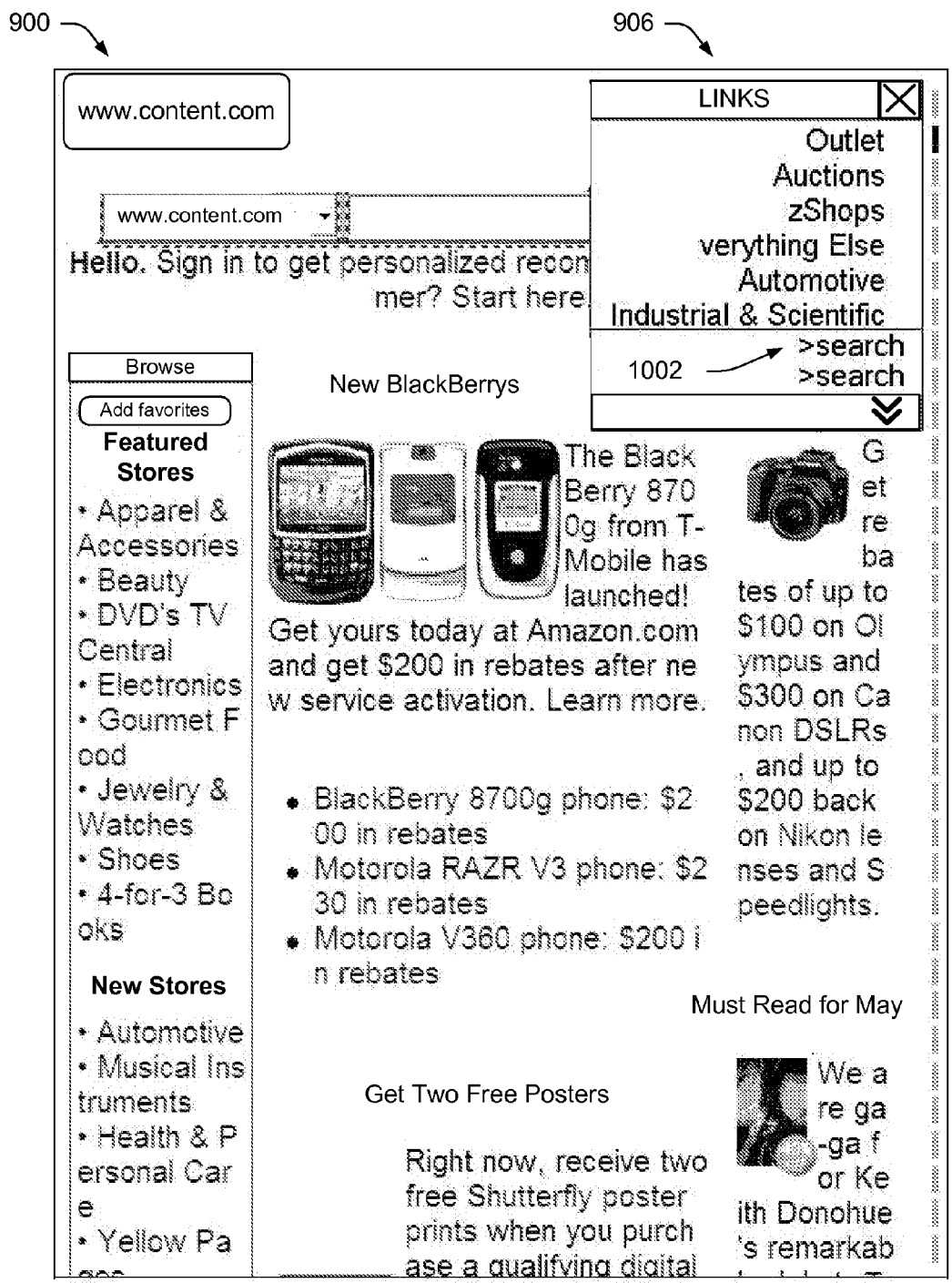

FIG. 10 continues illustration of screen 900 after selection of actuator 910. As illustrated, additional links within menu 906 have been displayed. FIG. 10 also includes a search object 1002 within menu 906. This object may correspond to a search text box within the illustrated web page. A user may select search object 1002 and, in response, may be presented with a text box in which to search the illustrated web page. Note, in the illustrated implementation, the ">" sign indicates to the user that the object corresponds to a text box. Other implementations may utilize other symbols or no symbol.

Figure 11:
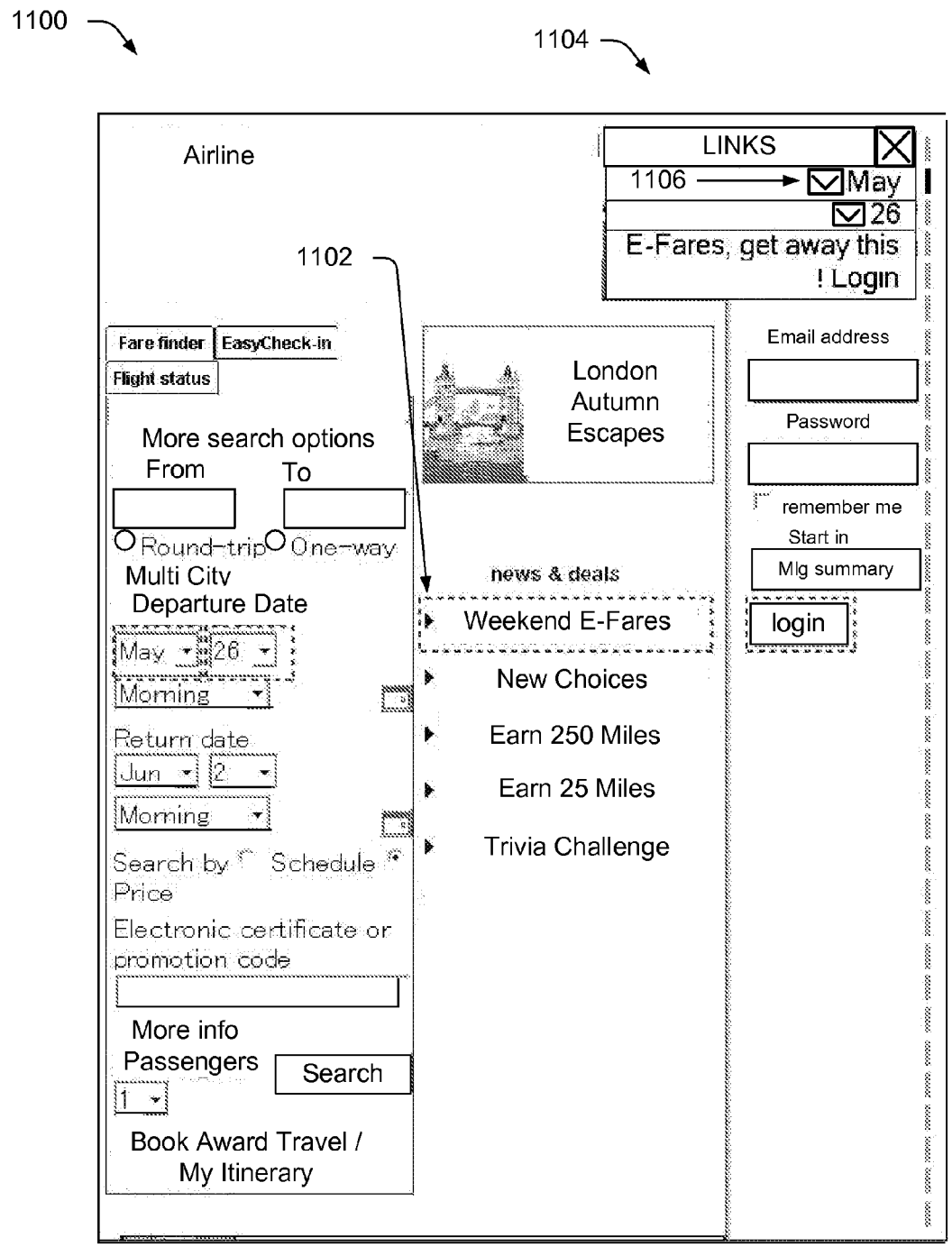
Figure 12:
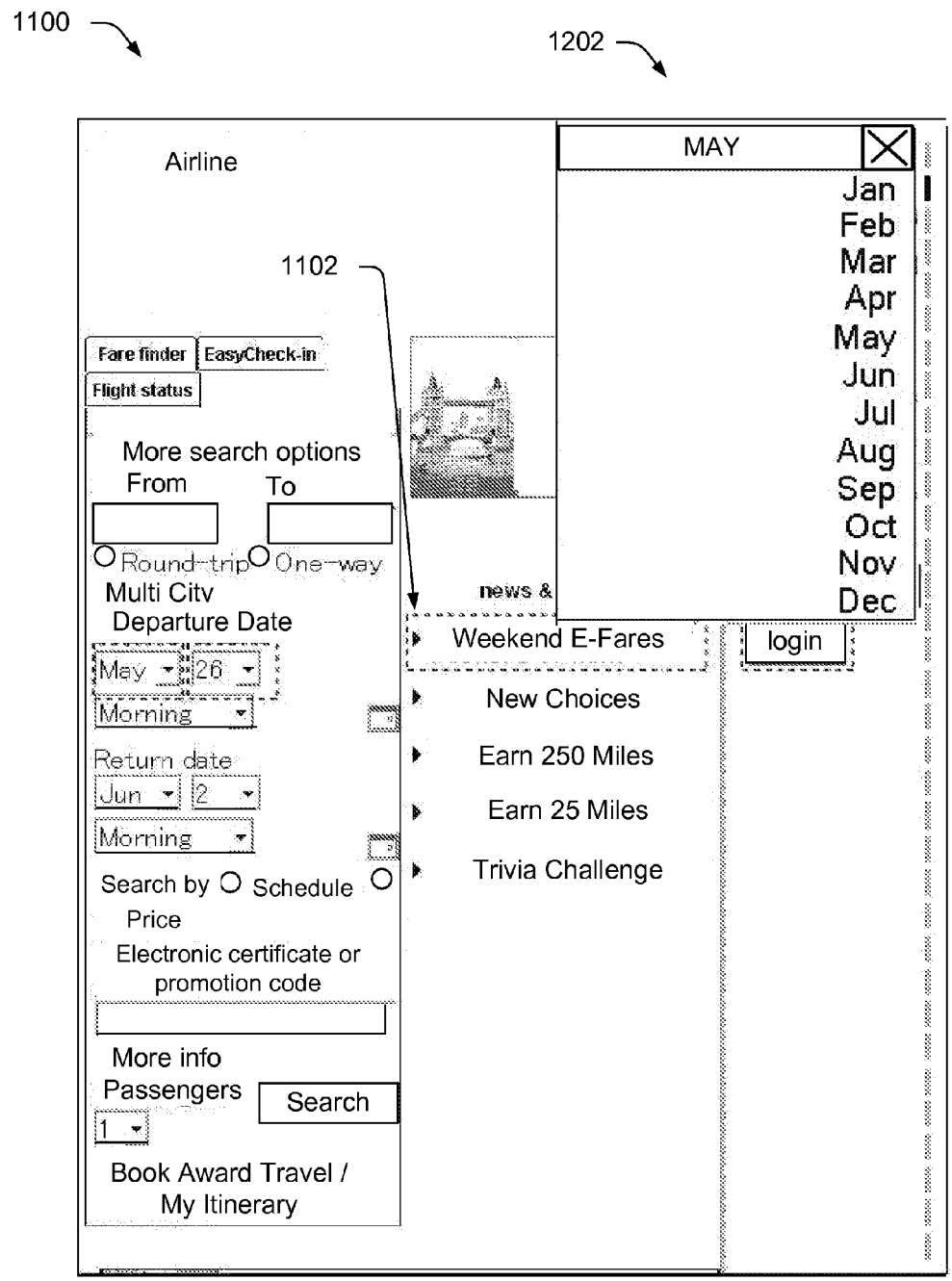

FIG. 11 illustrates another screen 1100 which may be rendered on display 102 of reader 100. Screen 1100 includes a zone 1102. After actuation of this zone, a menu 1104 may be presented to the user. Menu 1104 may include another type of drop-down object 1106, which, when actuated, may result in a listing of associated objects such as links. FIG. 12 continues the illustration of screen 1100 after actuation of object 1106. As illustrated, a menu 1202 is displayed in response to this actuation.

Figure 13:
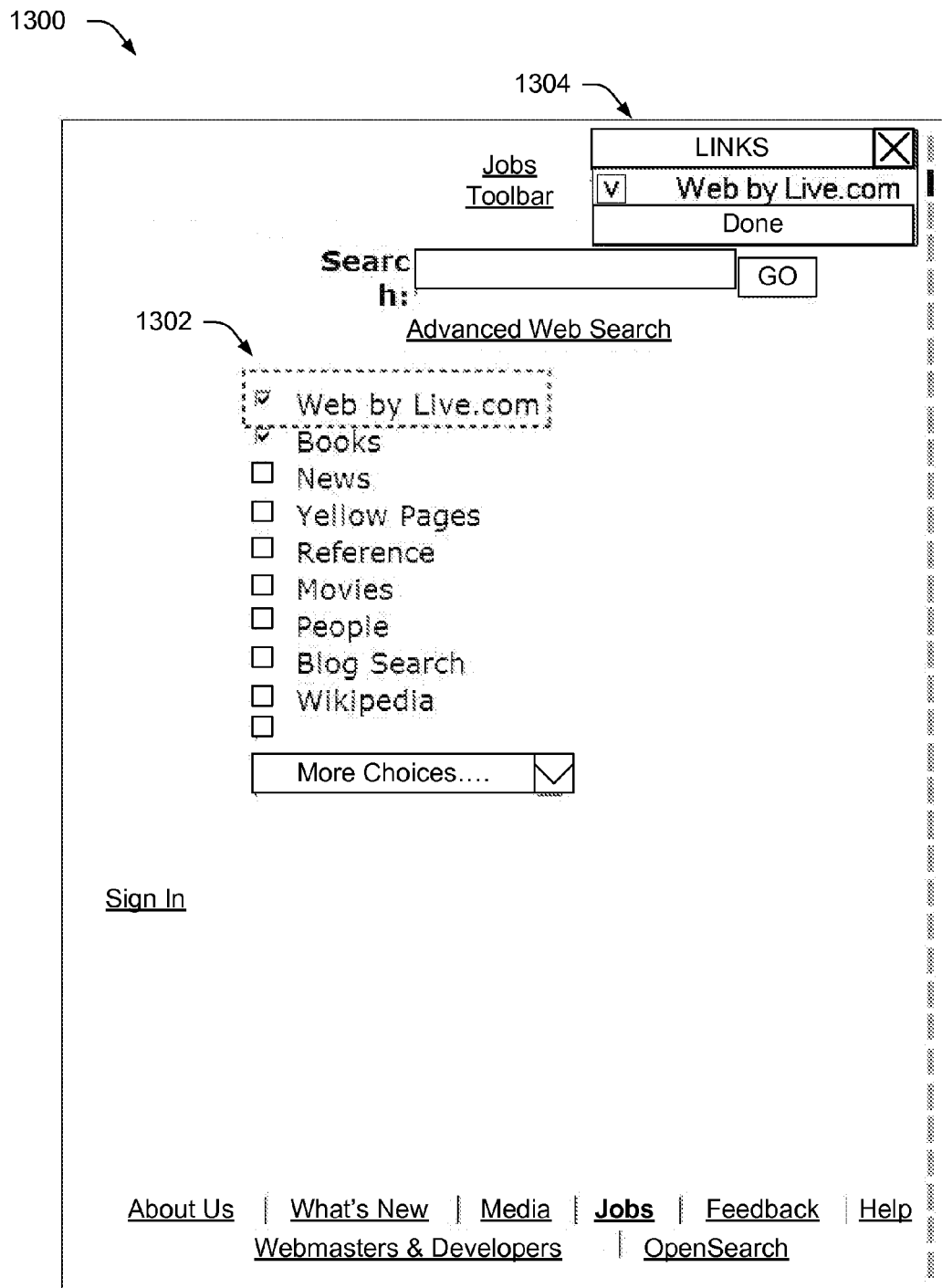

FIG. 13 illustrates another screen 1300 including a zone 1302 corresponding to a single check-box object. After selection of zone 1302, screen 1300 is shown to display a menu 1304. A user may use this menu to check or uncheck the object within the menu.

Figure 14:
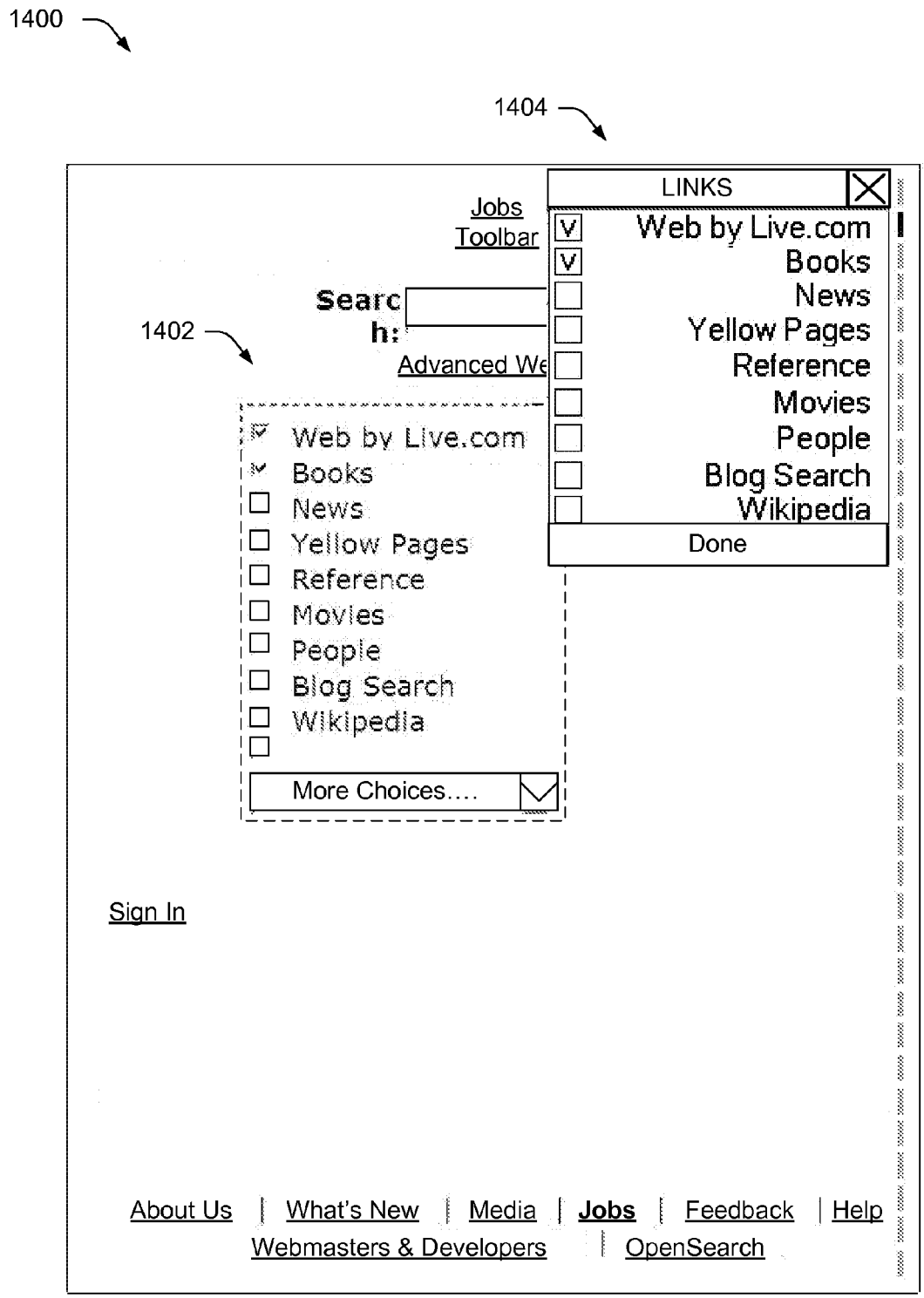

While FIG. 13 shows a zone with a single check box, FIG. 14 illustrates another screen 1400 where a zone 1402 may include more than one check box. In this instance, each of the illustrated text boxes is located within zone 1402. After a user selection of this zone, screen 1400 displays a menu 1404, which allows a user to check or uncheck objects within the menu.

Figure 15:
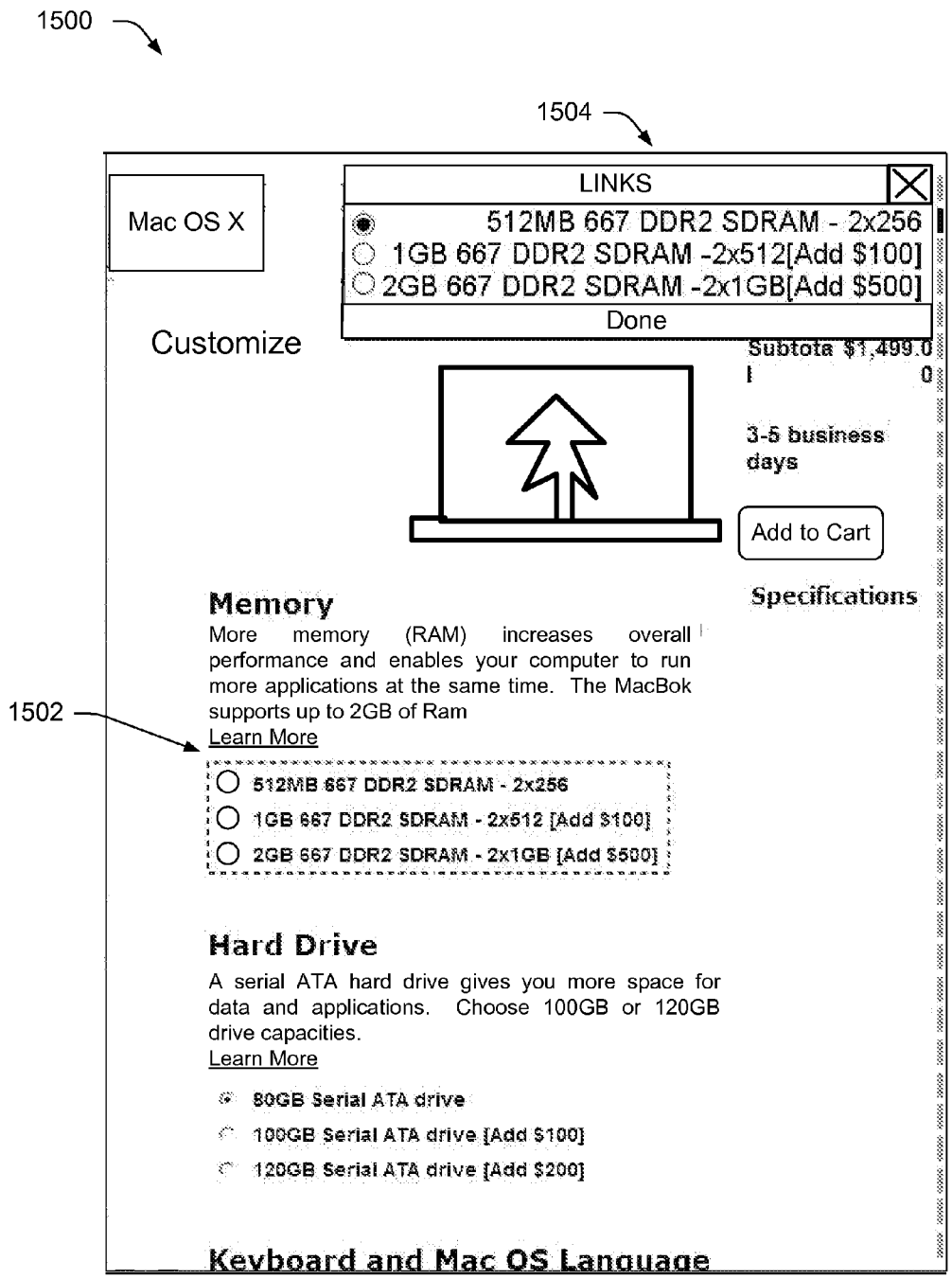

FIG. 15 depicts an illustrative screen 1500 which includes a zone 1502. This zone includes an object in the form of another type of check box. As illustrated, selection of zone 1502 results in screen 1500 displaying a menu 1504.

Figure 16:
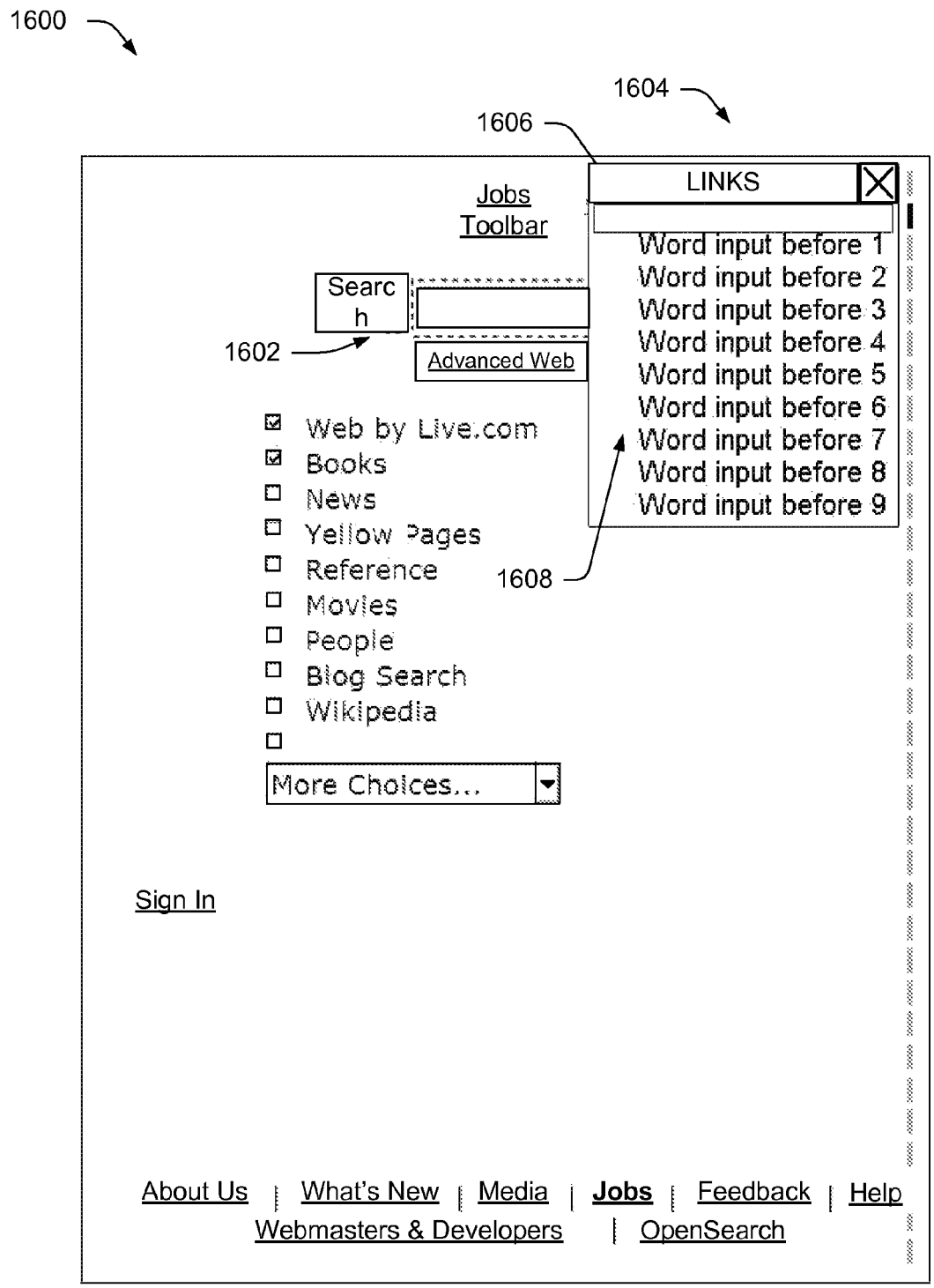

FIG. 16 illustrates another illustrative screen 1600 including a zone 1602. Zone 1602 includes a text-box object to enable a user to conduct a search. After selection of zone 1602, screen 1600 presents a menu 1604 to enable a user to enter text into the text box via box 1606. This menu may also present to the user text strings 1608 previously input by the user. Therefore, the user may either manually enter text into the search box via box 1606 or the user may choose one of text strings 1608 that the user previously input into a text box. In other instances, text strings 1608 may comprise popular searches, or the like, rather than previously-inputted text strings.

Figure 17:
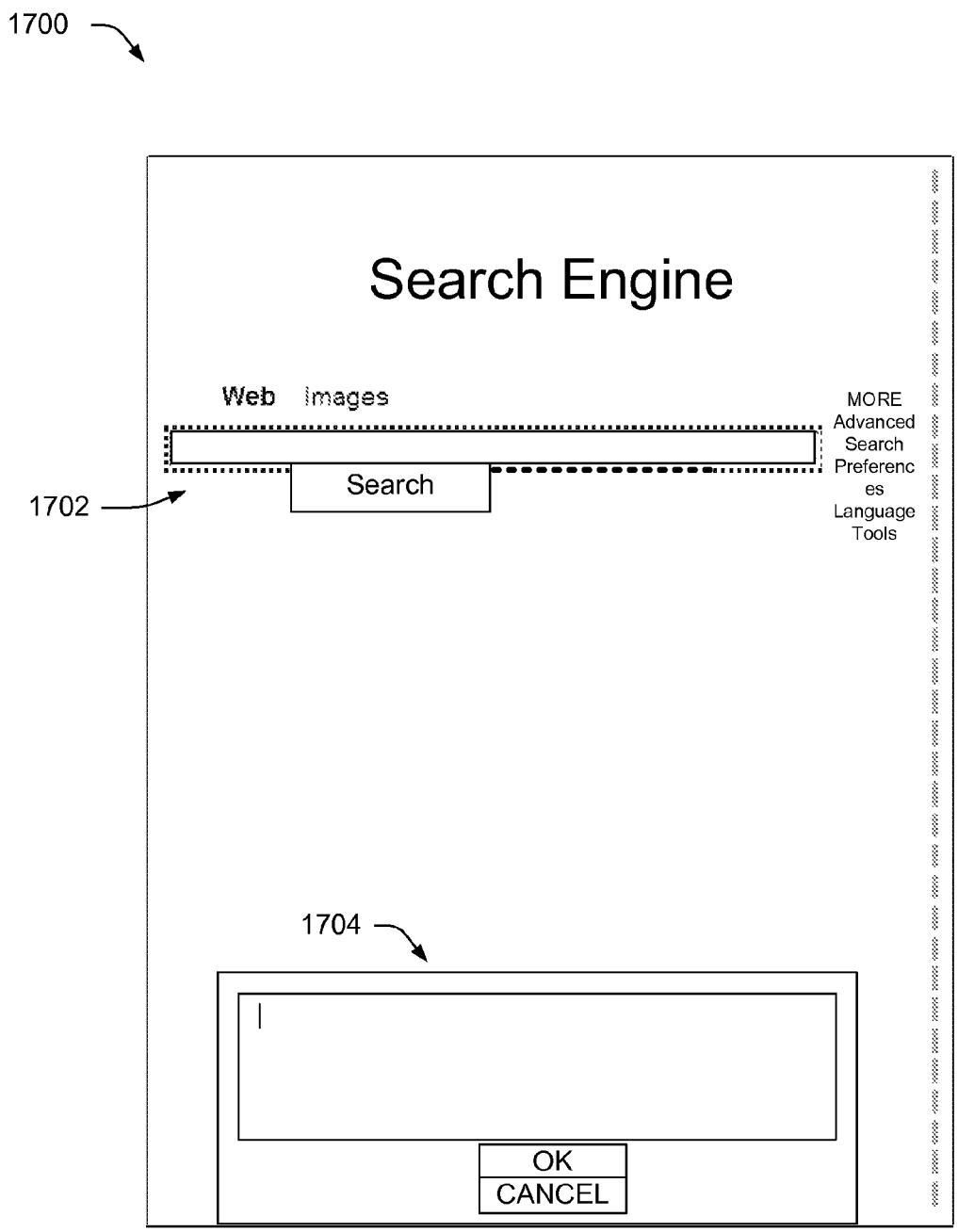
Figure 18:
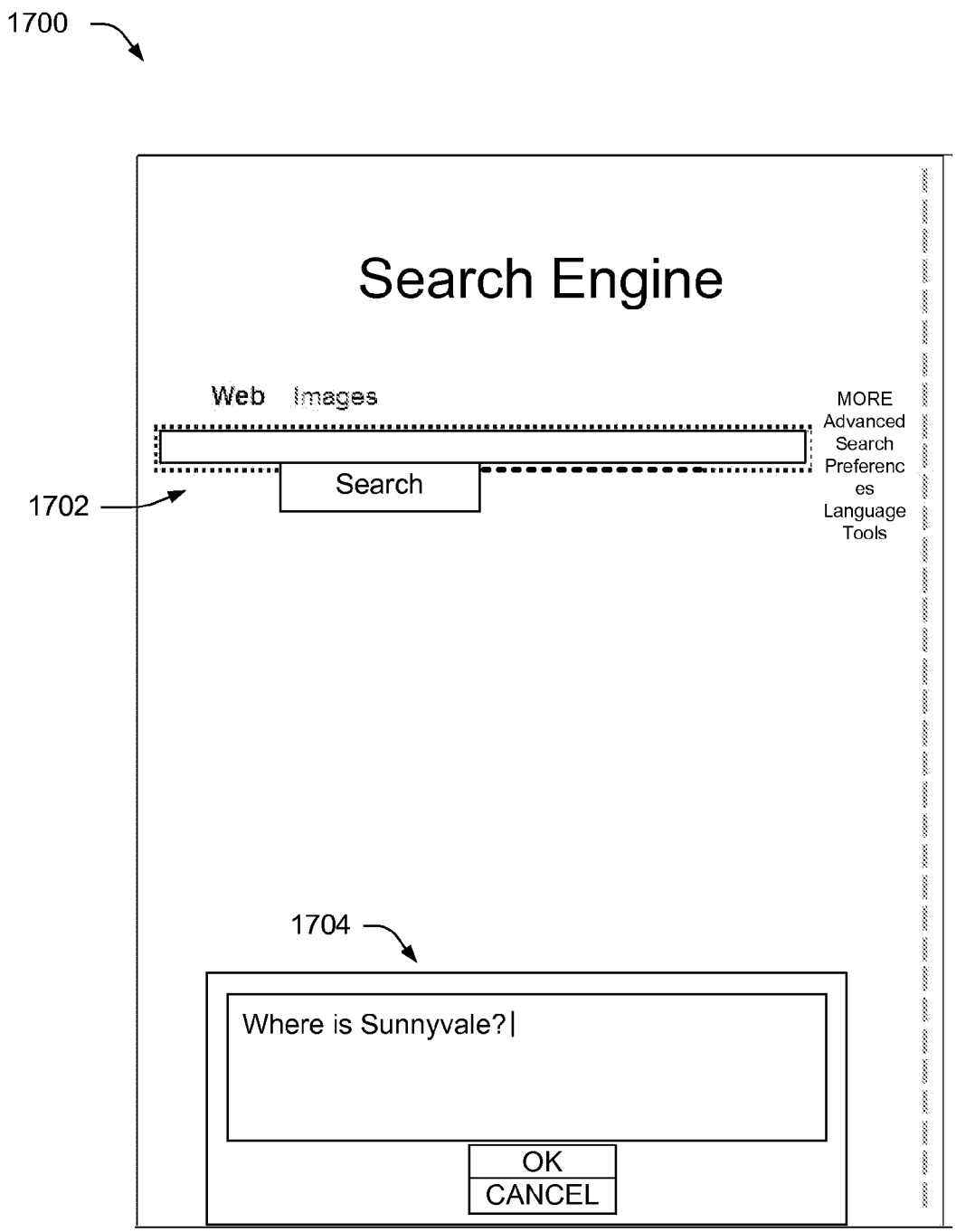
Figure 19:
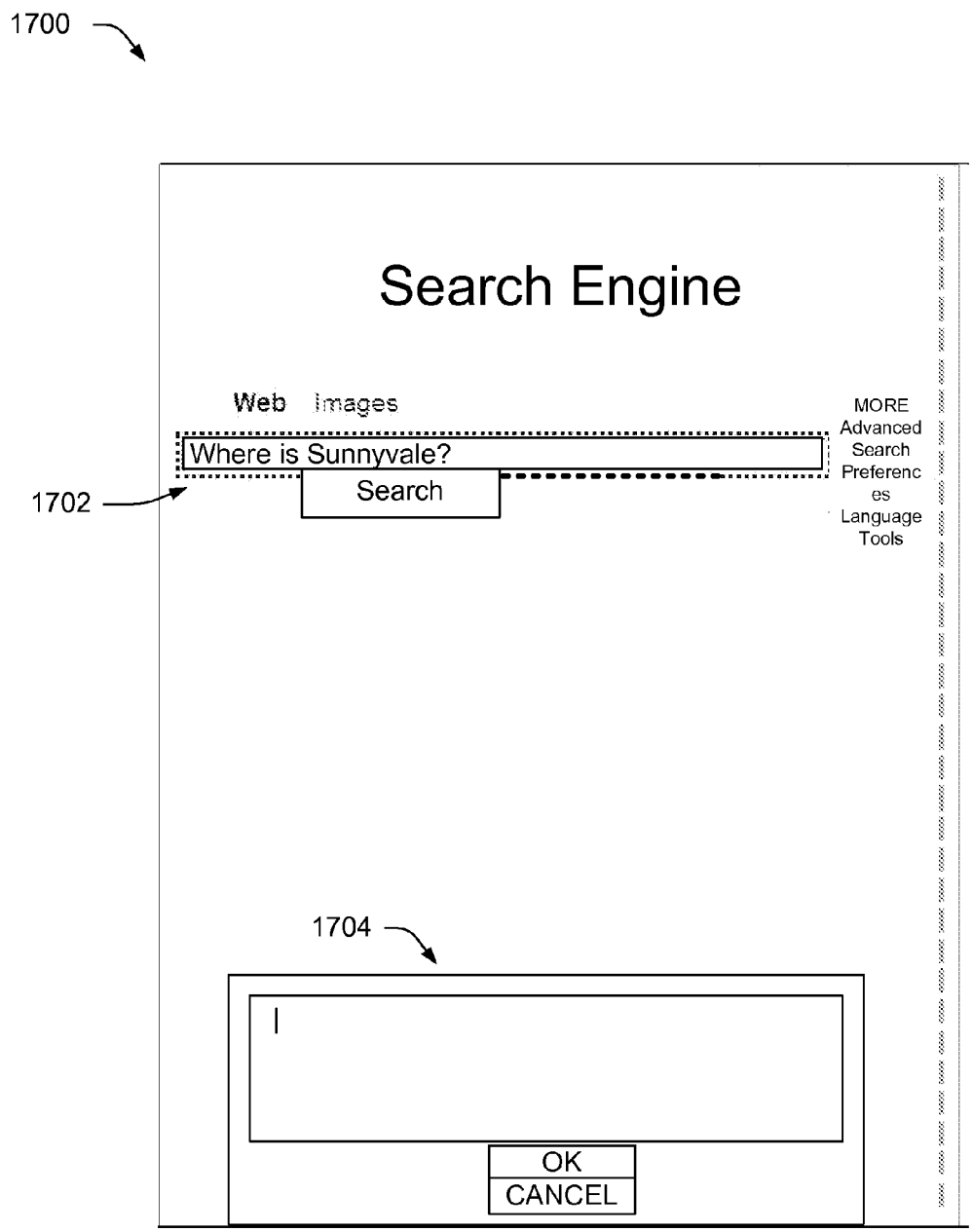
Figure 20:
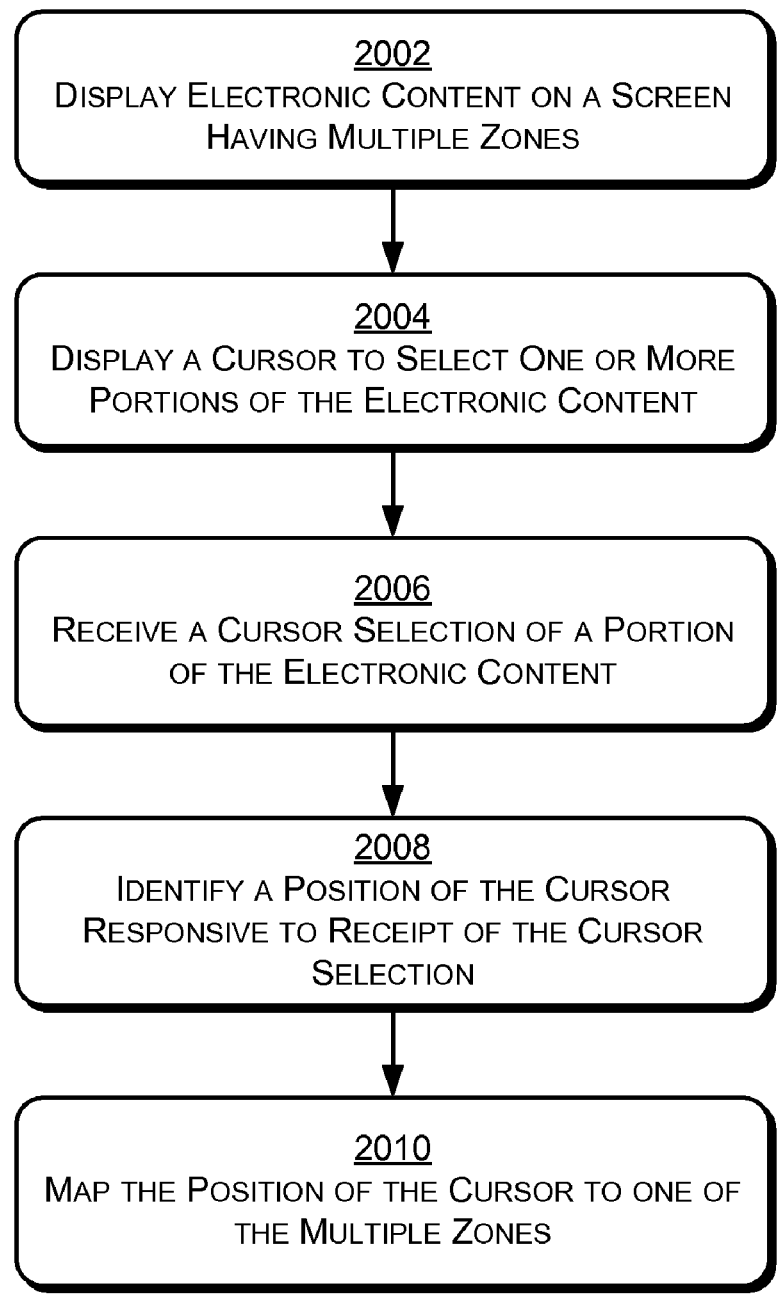
FIG. 20-23 are flow diagrams of processes for implementing zone-associated objects.
Figure 21:
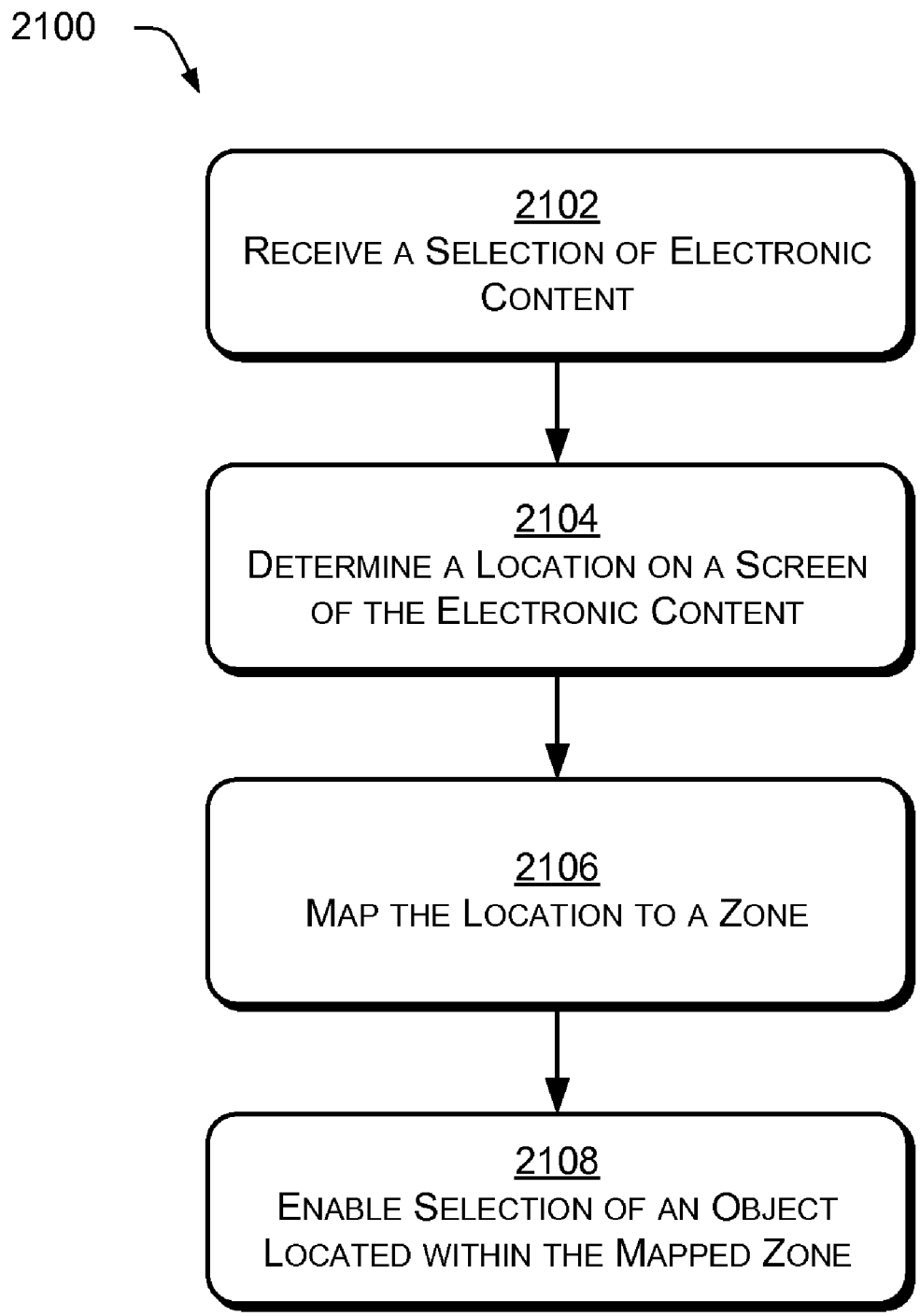
Figure 22:
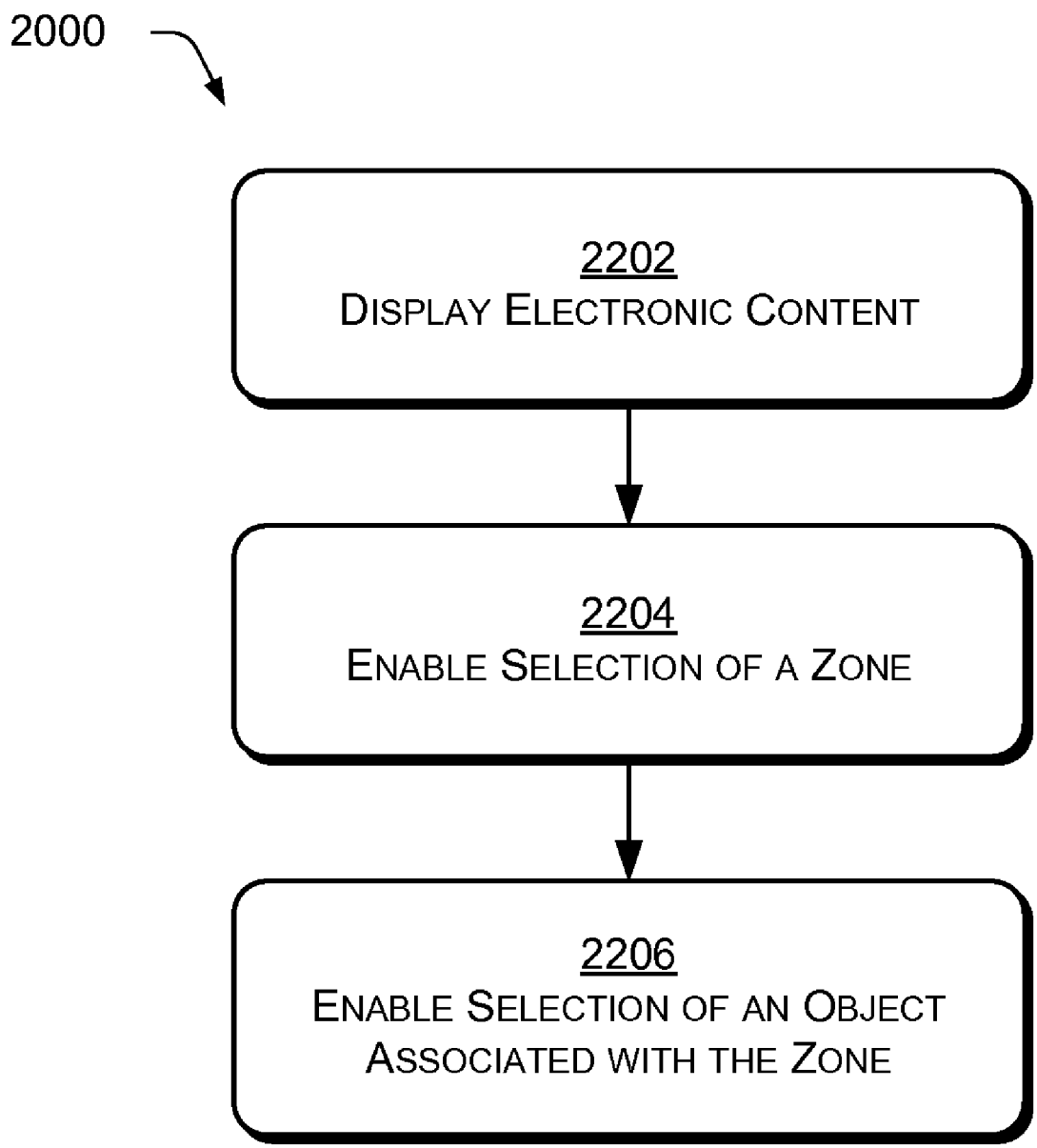
Figure 23:
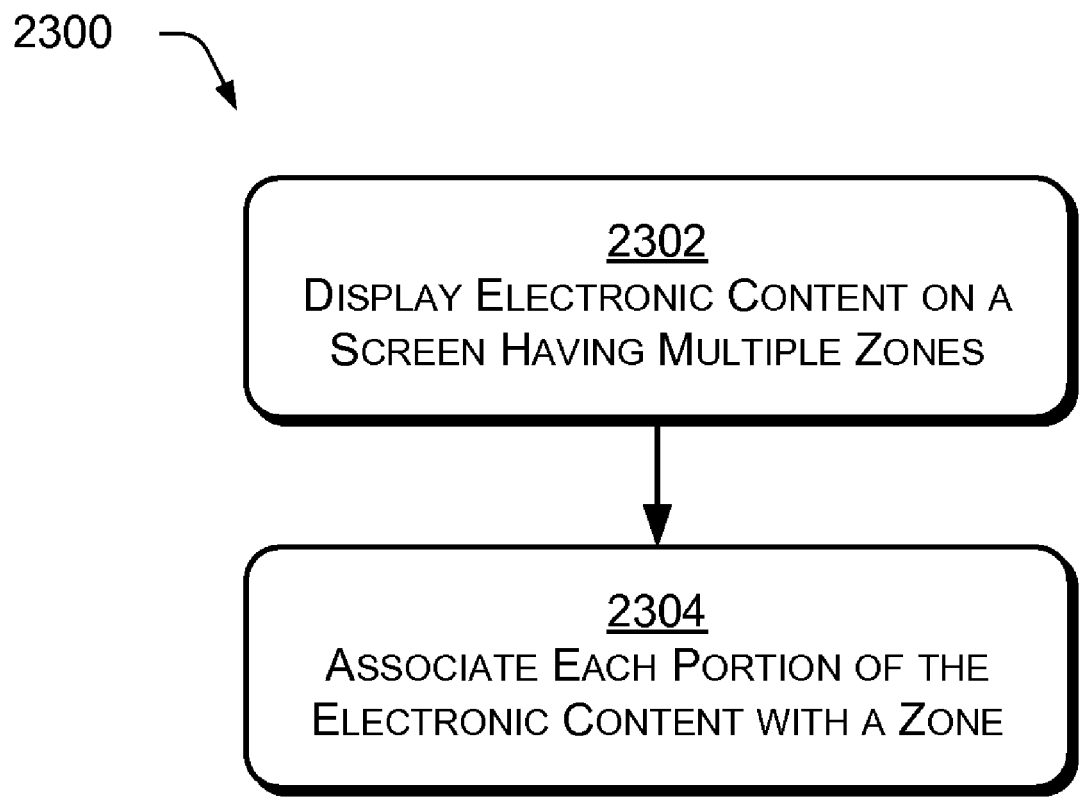

FIG. 17 illustrates another screen 1700 including a zone 1702, the zone including another text-box object. In response to selection of zone 1702, screen 1700 may present a text box 1704. A user may then enter text into text box 1704, as illustrated in FIG. 18. After the user selects the "OK" button, this text may then be input to the text-box object within zone 1702, as FIG. 19 illustrates.

Operation

FIGS. 20-23 illustrate processes 2000, 2100, 2200, and 2300 for implementing zone-associated objects. These processes are illustrated as a collection of blocks in a logical flow graph, which represent a sequence of operations which may be implemented in hardware, software, or a combination thereof. In the context of software, the blocks represent computer-executable instructions which, when executed by one or more processors, perform the recited operations. Generally, computer-executable instructions include routines, programs, objects, components, data structures, and the like to perform particular functions or implement particular abstract data types. These instructions may be embodied as computer readable program code stored on a computer-readable medium. This computer readable medium may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which may be used to store the desired information and which may be accessed by a computing device. In addition, the order in which the operations of the processes are described is not intended to be construed as a limitation, and any number of the described blocks may be combined in any order and/or in parallel to implement the process.

Process 2000 includes operation 2002, which displays electronic content on a screen having multiple zones. These zones may be defined in multiple ways, as discussed above. Operation 2004 represents displaying a cursor to select one or more portions of the electronic content. Operation 2006 then receives a cursor selection of a portion of the electronic content. Operation 2008 then identifies a position of the cursor responsive to receipt of the cursor selection. Finally, operation 2010 maps the position of the cursor to one of the multiple zones.

Process 2100 includes operation 2102, which represents receiving a selection of electronic content displayed upon a screen, the screen having multiple zones. Operation 2104 determines a location on the screen of the selected electronic content. Operation 2106 then maps this determined location to one of the multiple zones. Finally, operation 2108 enables selection of an object located within the mapped zone.

Process 2200, meanwhile, includes operation 2202. This operation also displays electronic content on a screen having multiple zones. Operation 2204 then enables selection of one of the multiple zones. Operation 2206 then enables selection of an object displayed within the electronic content and associated with a selected zone. Finally, process 2300 includes operation 2302, which again displays electronic content on a screen having multiple zones. At operation 2304, each portion of the electronic content is then associated within one or more of the multiple zones.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   displaying electronic content on a screen having multiple zones, at least two of the multiple zones overlapping;
   displaying a cursor to select one or more portions of the electronic content;
   receiving a cursor selection of a portion of the electronic content;
   identifying a position of the cursor responsive to receipt of the cursor selection;
   mapping the position of the cursor to one of the multiple zones; and
   enabling selection of one of multiple selectable objects located in the one of the multiple zones responsive to the mapping by displaying a menu of the multiple selectable objects located within the one of the multiple zones;
   wherein at least one of the multiple selectable objects is associated with at least two of the multiple zones.

2. A method as recited in claim 1, wherein a layout of the multiple zones is predefined.

3. A method as recited in claim 1, wherein the multiple zones are configured to dynamically change based upon the displayed electronic content.

4. A method as recited in claim 1, further comprising enabling modification of a portion of the displayed electronic content within the one of the multiple zones responsive to the mapping.

5. A method as recited in claim 1, further comprising displaying unique symbols adjacent one or more selectable objects located within the one of the multiple zones responsive to the mapping.

6. A method as recited in claim 1, further comprising highlighting one selectable object from multiple selectable objects located within the one of the multiple zones responsive to the mapping.

7. A method comprising:
   receiving selection of electronic content displayed upon a screen, the screen having a plurality of zones, at least two of the plurality zones overlapping;
   determining a location of a cursor on the screen of the selected electronic content;
   mapping the location of the cursor to one of the plurality of zones; and
   enabling selection of a selectable object from multiple selectable objects located within the mapped zone by displaying a menu of the multiple selectable objects located within the mapped zone;
   wherein at least one of the multiple selectable objects is associated with at least two of the multiple zones.

8. A method as recited in claim 7, wherein each of the plurality of zones comprises a horizontal strip of the screen.

9. A method as recited in claim 7, wherein each of the plurality of zones comprises a portion of a grid overlaying the screen.

10. A method comprising:
    displaying electronic content on a screen, the screen having a plurality of zones, at least two of the plurality of zones overlapping;
    enabling selection of one of the plurality of zones; and
    responsive to selection of the one of the plurality of zones, enabling selection of a selectable object from multiple selectable objects displayed within the electronic content and associated with the selected zone, wherein enabling selection of the selectable object comprises presenting a menu of the multiple selectable objects associated with the selected zone;
    wherein enabling selection of the one of the plurality of zones comprises enabling: (1) alignment of a cursor with a selectable marker corresponding to the selected zone, or (2) alignment of the cursor with the selected zone;
    wherein at least one of the multiple selectable objects is associated with at least two of the multiple zones.

11. A method as recited in claim 10, wherein each of the plurality of zones is of approximately equal area.

12. A method as recited in claim 10, wherein each of the plurality of zones contains an approximately equal byte offset of displayed content.

13. A method as recited in claim 10, wherein the selected marker is a numeral or letter, the numeral or letter corresponding to the selected zone.

14. A method as recited in claim 10, wherein the object is a web link, and wherein enabling selection of the object comprises presenting the web link and a corresponding uniform resource locator (URL).

15. A method as recited in claim 10, wherein enabling selection of the object comprises enabling selection of a numeral or letter, the numeral or letter corresponding to the selected object.

16. A method as recited in claim 10, wherein enabling selection of the object comprises presenting, adjacent the selected object, a symbol corresponding to selected object.

17. A method as recited in claim 10, wherein enabling selection of the object comprises highlighting the selected object.

18. A method as recited in claim 10, wherein the screen displays one or more objects, and further comprising associating each of the one or more objects with one or more of the plurality of zones.

19. A method as recited in claim 10, further comprising executing a command defined by the object associated with the selected zone in response to a selection of the object.

20. A method as recited in claim 10, wherein the object associated with the selected zone comprises one of: a web link, a link to a locally-stored digital item, a link to a location within a currently-displayed digital item, or a link to a store to purchase digital items.

21. An apparatus comprising:
    a screen to display a digital item and one or more links to locations within the displayed digital item, the screen including a plurality of zones;
    a zone-association module to enable association of the one or more links with the plurality of zones; and
    a selection tool to enable selection of one of the plurality of zones and to enable selection of a selectable link from multiple selectable links displayed within the selected zone by displaying a menu of the multiple selectable links located within the selected zone;
    wherein at least some of the plurality of zones overlap with one another such that at least one of the one or more links is associated with at least two zones.

22. An apparatus as recited in claim 21, wherein the one or more links further comprise one or more of the following: a web link, a link to another locally-stored digital item, or a link to a store to purchase digital items.

23. An apparatus as recited in claim 21, wherein the selection tool comprises a cursor to enable selection of one or more selectable markers within the displayed digital item.

24. An apparatus as recited in claim 21, wherein the selection tool comprises a keypad.

25. A computer program product comprising one or more computer-usable media storing computer-readable program code embodied in the media for:
   displaying electronic content on a screen having multiple zones, at least two of the multiple zones overlapping;
   associating each portion of the electronic content with at least one of the multiple zones;
   receiving a selection of one of the multiple zones; and in response to receiving the selection, enabling selection of a selectable portion of electronic content from multiple selectable portions associated with the selected zone by displaying a menu of the multiple selectable portions located within the selected zone, wherein at least one of the multiple selectable portions is associated with at least two of the multiple zones.

26. The computer program product as recited in claim 25, wherein the multiple zones include a first zone and a second zone, and wherein the first zone overlaps with the second zone.

27. The computer program product as recited in claim 25, wherein each portion of the electronic content is associated with a zone within which each portion resides.

* * * * *